(12) United States Patent
Canada et al.

(10) Patent No.: US 10,943,403 B2
(45) Date of Patent: Mar. 9, 2021

(54) OBJECT PREVIEW IN A MIXED REALITY ENVIRONMENT

(71) Applicant: A9.com, Inc., Palo Alto, CA (US)

(72) Inventors: Jason Canada, San Francisco, CA (US); Rupa Chaturvedi, Menlo Park, CA (US); Jared Corso, San Mateo, CA (US); Michael Patrick Cutter, Mountain View, CA (US); Sean Niu, San Francisco, CA (US); Shaun Michael Post, San Mateo, CA (US); Peiqi Tang, Santa Clara, CA (US); Stefan Vant, Seattle, WA (US); Mark Scott Waldo, Richmond, CA (US); Andrea Zehr, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

(21) Appl. No.: 16/397,673

(22) Filed: Apr. 29, 2019

(65) Prior Publication Data
US 2019/0251753 A1     Aug. 15, 2019

Related U.S. Application Data

(63) Continuation of application No. 15/595,670, filed on May 15, 2017, now Pat. No. 10,319,150.

(51) Int. Cl.
*G06T 19/00* (2011.01)
*G06T 11/60* (2006.01)
(Continued)

(52) U.S. Cl.
CPC ............ *G06T 19/006* (2013.01); *G06T 11/00* (2013.01); *G06T 11/60* (2013.01); *G06F 3/147* (2013.01);
(Continued)

(58) Field of Classification Search
CPC .................................................. G06T 19/006
See application file for complete search history.

(56) References Cited

U.S. PATENT DOCUMENTS

| 8,199,966 B2 | 6/2012 | Guven |
| 8,554,639 B2 | 10/2013 | Dollens |

(Continued)

OTHER PUBLICATIONS

Non-Final Office Action issued in co-related U.S. Appl. No. 15/595,670 dated May 17, 2018.

(Continued)

*Primary Examiner* — Robert J Craddock
(74) *Attorney, Agent, or Firm* — Hogan Lovells US LLP

(57) ABSTRACT

Users can view images or renderings of items placed (virtually) within a physical space. For example, a rendering of an item can be placed within a live camera view of the physical space. A snapshot of the physical space can be captured and the snapshot can be customized, shared, etc. The renderings can be represented as two-dimensional images, e.g., virtual stickers or three-dimensional models of the items. Users can have the ability to view different renderings, move those items around, and develop views of the physical space that may be desirable. The renderings can link to products offered through an electronic marketplace and those products can be consumed. Further, collaborative design is enabled through modeling the physical space and enabling users to view and move around the renderings in a virtual view of the physical space.

20 Claims, 13 Drawing Sheets

(51) Int. Cl.
*G06T 11/00* (2006.01)
*G06T 19/20* (2011.01)
*G06F 3/147* (2006.01)
*G06F 3/14* (2006.01)

(52) U.S. Cl.
CPC ............ *G06F 3/1454* (2013.01); *G06T 19/20* (2013.01); *G09G 2340/12* (2013.01)

(56) References Cited

U.S. PATENT DOCUMENTS

| | | |
|---|---|---|
| 9,367,870 B2 | 6/2016 | Klein |
| 9,519,932 B2 | 12/2016 | Calman |
| 2008/0071559 A1 | 3/2008 | Arrasvuori |
| 2013/0278631 A1 | 10/2013 | Border |
| 2015/0066681 A1* | 3/2015 | Jones .................... E04H 13/001 705/26.5 |

OTHER PUBLICATIONS

Final Office Action issued in co-related U.S. Appl. No. 15/595,670 dated Oct. 29, 2018.
Zhu et al., Design of the PromoPad: An Automated Augmented Reality Shopping Assistant, Aug. 6, 2006, Americas Conference on Information Systems, 1-16 (2006).
Notice of Allowance issued in co-related U.S. Appl. No. 15/595,670 dated Jan. 31, 2019.

* cited by examiner

OBJECT PREVIEW IN A MIXED REALITY ENVIRONMENT

CROSS REFERENCE TO RELATED APPLICATION

This application is a Continuation of, and accordingly claims the benefit of, allowed U.S. patent application Ser. No. 15/595,670, filed with the U.S. Patent and Trademark Office on May 15, 2017, which is hereby incorporated herein by reference.

BACKGROUND

Users are increasingly utilizing electronic devices to research, locate, and obtain various types of information. For example, users may utilize a search engine to locate information about various items, such as furniture or other home-related items offered through an electronic marketplace. In many instances, a user wanting to purchase a piece of furniture online must base the decision solely on item measurements provided online, space measurements manually taken of the available physical space, and the view in the user's head of how the item would look in that space. While such an approach can have the benefit of seeing how an object might look in a room or other region, often times such an approach will only be available for a single item or specific items. Further, a user will often see items in person when the user is away from home, and there is currently no mechanism for the user to obtain a similar overlay view in such a location. It also is difficult for others to assist, in an electronic environment, with the selection of items for that space.

BRIEF DESCRIPTION OF THE DRAWINGS

Various embodiments in accordance with the present disclosure will be described with reference to the drawings, in which.

DETAILED DESCRIPTION

Figure 1:
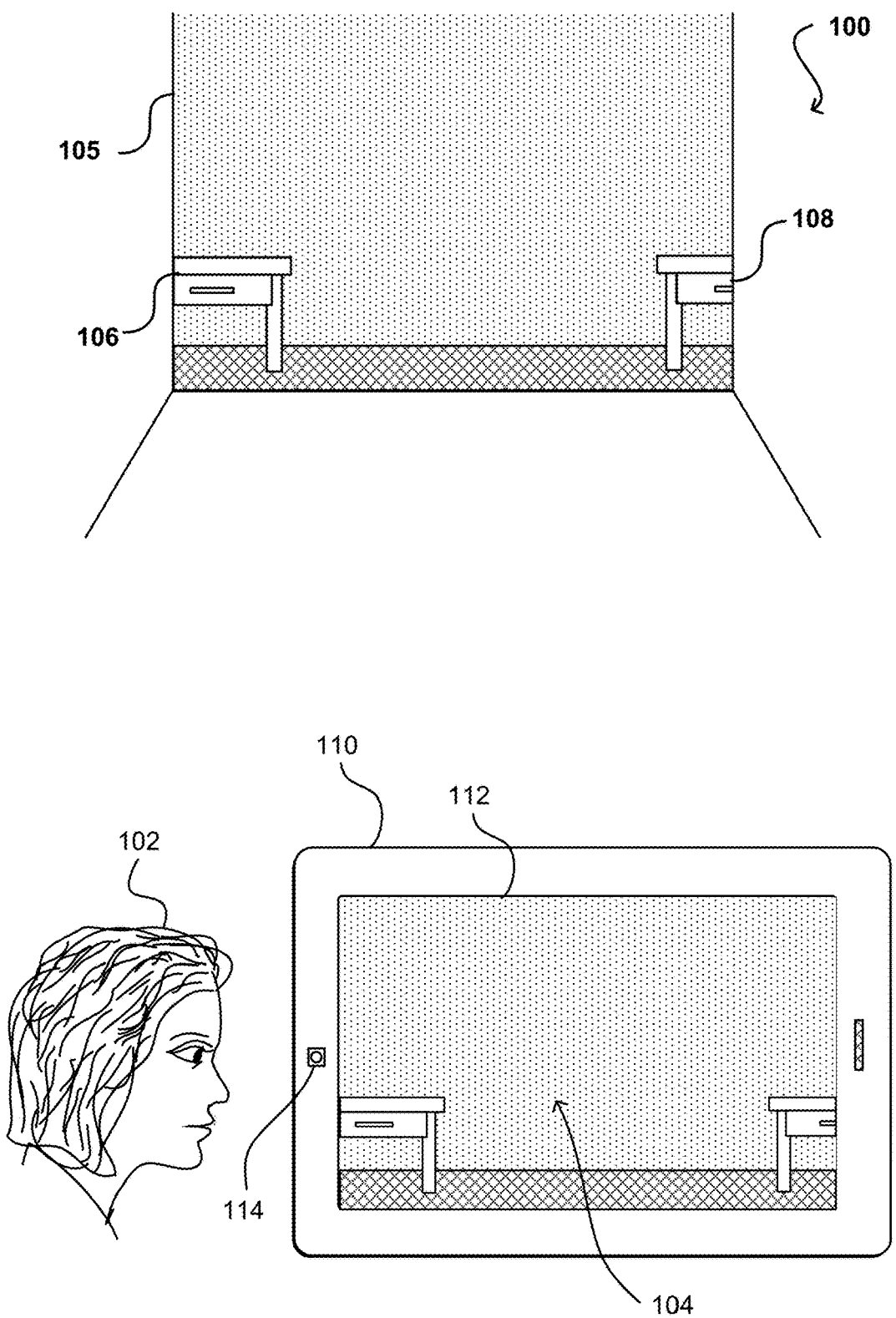
FIG. 1 illustrates an example environment in which various embodiments can be utilized, in accordance with an embodiment.

Systems and methods in accordance with various embodiments of the present disclosure may overcome one or more of the aforementioned and other deficiencies experienced in conventional approaches to enabling a user to select items, in an electronic or "online" environment, for placement in a physical space. In particular, various embodiments provide for viewing images or renderings of items placed (virtually) within the physical space. For example, a rendering of an item can be placed within a live camera view of the physical space. A snapshot of the physical space (e.g., canvas) can be captured and the snapshot can be customized, shared, and the renderings within the snapshot can be consumed (e.g., purchased, rented, etc.). The renderings can be represented as two-dimensional images, e.g., virtual stickers, icons, or other such renderings as will be described further herein, or three-dimensional models of the items, and can be manipulated, e.g., rotated, enlarged, reduced in size, etc. The renderings can link to products offered through an electronic marketplace and those products can be consumed.

A number of approaches may be implemented to locate items that can be viewed virtually within the physical space. Locating the items can include submitting a search request for the items, receiving recommendations for items, discovering items, etc. In an example, items presented on an electronic marketplace may be associated with a virtual button or other such user-selectable element that enables the user to view that item virtually in the physical space. This can include, for example, providing a virtual sticker (e.g., two-dimensional rendering) of the item, model, or other such rendering that the user can insert or otherwise "place" into the image data (e.g., multiple still images, video, live image data, etc.) of the live camera view of the physical space.

In certain embodiments, the physical space can be mapped and modeled, including dimensions and visuals, in order to enable the user to view images or renderings of items placed (virtually) within that space as well as recommend images or renderings of items to place virtually within the physical space. In this example, the items can have three-dimensional models (or other scale-appropriate views) such that when an image of an item is "placed within" the virtual space, whether a rendering of a view of a three-dimensional model or otherwise, the item will appear with an appropriate scale for the representation of the space. The user can then determine whether the item will fit in certain locations, and can also determine whether the user likes the look of the item in that space and where the item would most likely be placed in that space.

In order to obtain the data needed to generate the virtual space, image data can be captured of the physical space. The image data can be obtained with additional data, in at least some embodiments, in order to determine distances, scale, and dimensions of different portions of the physical space, as well as items contained within the physical space. This can include using a camera (digital still or video) to capture images (or video frames) of the space, which can then be analyzed to generate a model of the space. In at least some embodiments, additional data such as disparity data from stereoscopic images, distance data, structured light data, sensor data from a moveable camera, and the like can be utilized to provide scale and dimension data. In at least some embodiments, images can be captured at least partially from above a space in order to capture data for an overview of the area. While the overview can be captured using multiple cameras in some embodiments, in other embodiments other such devices can capture image data, where motion sensors (accelerometers, inertial sensors, gyroscopes, compasses), distance sensors (laser sensors, ultrasonic sensors, stereoscopic cameras, time of flight systems), or other such components can be used to determine scale and other such data.

Once the data for the scene is obtained, a model, mapping, or other digital representation can be generated that can enable the user and others to obtain various views of the scene, such as by using various computing devices. A user can obtain a two-dimensional view from a desired viewpoint in some embodiments, which can allow virtual stickers and other two-dimensional views of items to be virtually displayed in the environment, whether overlaying an image of the item or rendering a two-dimensional view of a three-dimensional model of the item, among other such options. In some embodiments the user can control a virtual camera when viewing a digital representation of the virtual space, in order to obtain views of items in the space from different viewpoints. Since the dimensions of the space are known, there can be virtual boundaries established such that an item cannot conflict in virtual space with another item, such that only items that fit in a certain location can be placed in that location (unless moving another item in the space, etc.). In at least some embodiments, a location can be designated by the user and then only items that will fit in that space presented as options to the user. Further, if locations can be determined (such as a floor or table) then there might be restrictions as to where certain items can be placed in some embodiments. Such an approach can help a user to select various items and view how those items would look in different combinations and/or locations in the space, in order to enable the user to determine which items to purchase.

In addition to selecting and viewing items for the virtual space, a user can generate images or renderings of items to place virtually within the physical space. The user can capture an image of an item of interest, or otherwise indicate an item is of interest from a webpage or other interface. An application executing on the computing device or remote the computing device can analyze the image data that includes the item of interest to generate a two-dimensional rendering of the item of interest or a three-dimensional model of the item of interest. The two-dimensional rendering can be a "virtual sticker" or such rendering of the item of interest. In an example, the virtual sticker can include a representation of the item of interest as well as additional content, such as a border, a dropshadow, animations, filter effects, etc. The three-dimensional model (or other scale-appropriate views) can be displayed such that when an image of an item is placed within the virtual space, whether a rendering of a view of a three-dimensional model or otherwise, the item will appear with an appropriate scale for the representation of the space.

In addition to enabling the user to select and view items virtually in the physical space, various others can view and select items as well. In some embodiments the user can request assistance, such as by contacting friends and family or requesting assistance from a professional designer. In some instances a user can register for assistance with types of items, whereby friends and family can view and suggest items, which the user can then approve or deny before an item is purchased and shipped. Such an approach enables people to determine items that would go well in the space, as well as to give the user the ability to approve the item before it is purchased and shipped, to avoid the item being returned if the user does not want the item. In some embodiments the user might propose an alternative item or otherwise request a change, which would then have to be approved by the person who suggested the item. Various persons can suggest items, themes, locations, and other aspects that can help to design the space for the user. In some embodiments, a person suggesting an item that is approved by the user might get some level of credit or compensation for making the suggestion.

Various other functions and advantages are described and suggested below as may be provided in accordance with the various embodiments.

As mentioned, a user (often referred to herein as a "customer," to differentiate from other users, although a customer may not have had to purchase or obtain an item to qualify as a customer as discussed herein) may desire to obtain one or more items from an electronic marketplace, or other such electronic storefront, inspiration website, blog, etc., for placement in a specific space, such as a room of the customer's home. Unless the customer is in the physical space, the customer 102 may want to capture (or otherwise acquire) an image 104 of the physical space 105, such as is illustrated in the example situation 100 of FIG. 1. In this example, a user 102 is capturing image data (e.g., a live video stream) of a physical space 105 including a set of end tables 106 and 108. The user 102 is capturing the image data using a mobile computing device 110 that has a camera 112, by placing the end tables in the field of view of the camera 106. The image data is being displayed on a screen 112 of the computing device 110; for example, a real-time or near-real-time rendering of the image data being captured by the camera 114, which in this example would be of the physical space including the end tables. Although a portable computing device 110 (e.g., a smart phone or tablet computer) is shown, it should be understood that various other types of electronic devices that are capable of determining and processing input can be used as well in accordance with various embodiments. These devices can include, for example, notebook computers, personal data assistants, e-book readers, cellular phones, video gaming consoles or controllers, smart televisions, set top boxes, a wearable computer (e.g., a smart watch or glasses), and portable media players, among others.

Figure 2A:
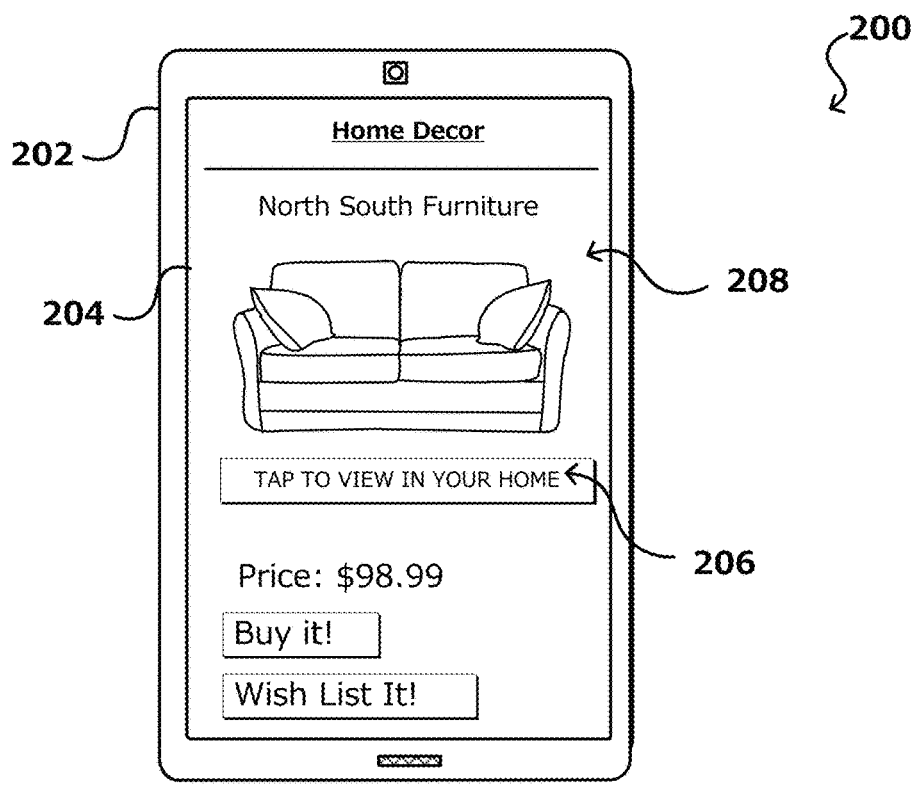
FIGS. 2A and 2B illustrate approaches to displaying content in an electronic environment, in accordance with an embodiment.

In accordance with various embodiments, the representation can be a virtual sticker, three-dimensional model, or other such rendering. Virtually placing items in the physical space can help the customer when browsing items on an electronic marketplace, such as to determine matching colors and patterns, as well as potential placements for various items. In some embodiments, a customer can select an image of an item, as may be available from an electronic marketplace or other such source, and overlay a virtual sticker or other rendering of the time over image 104 including a view of the scene. For example, example 200 of FIG. 2A illustrates an example electronic device 202. As shown, electronic device 202 includes a display 204. Display 204 is operable to show an online store where a user may access a variety of different products. As described herein, the term "catalog" may be used to describe a plurality of objects. Moreover, the term "objects" may be used interchangeably with the terms "items" and "products," for ease of explanation.

A catalog may be stored in a database either on the electronic device 202 or may be accessible by the device 202 from a server, for example, through a network (e.g., the Internet). In any case, some or all objects in the catalog may have various properties and/or attributes associated with it. For example, each item in a catalog may be associated with a unique identifier (ID), a particular product page, a representative 2D image, additional images, products other people have viewed, a price, a sale price, a rating, user comments, and dimensions (e.g., a product's height, width and depth), etc. In various embodiments, the dimensions of an object can be stored in a catalog (e.g., a database) and associated with the object.

Figure 2B:
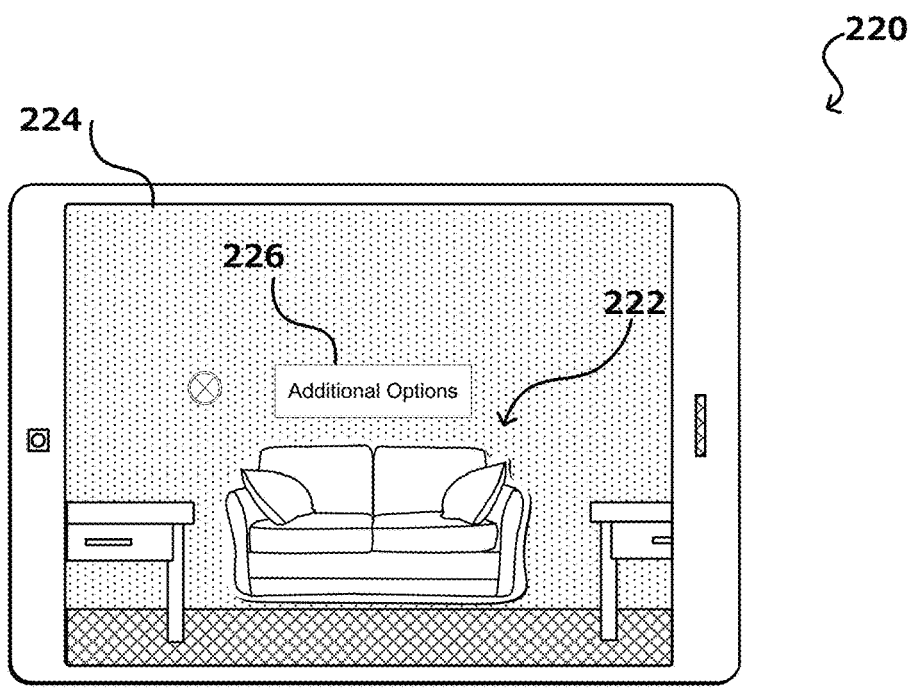

In some embodiments, some or all product pages, or other pages associated with an electronic marketplace or other electronic storefront or website, may include a widget (e.g., a virtual button 206) that allows a user to preview at least one product virtually within a physical space. For instance, a product page 208 may have a button 206 that allows the user to view the product associated with that product page in a camera environment (e.g., an augmented view of the physical space) as illustrated in example 220 of FIG. 2B. In this example, an image of a couch 222 is shown to be displayed over the view of the scene in the image 224. The image can be a two-dimensional rendering of the produce such as a virtual sticker, or such rendering of the product. In an example, the virtual sticker can include a representation of the product as well as additional content, such as a border, a drop shadow, etc. A user can interact with the sticker. For example, the user can rotate, enlarge, reduce in size, change the location of the sticker, etc. The user can further interact with the sticker by selecting one of a number of actions to be performed with respect to the virtual sticker. For example, selecting user-selectable element 226 can display options to remove the sticker, share the sticker, purchase the product represented by the sticker, save the product to a wish list, etc. Although user-selectable element 226 is illustrated as a single element linking to various options, in other embodiments the options can be illustrated as separate user-selectable elements, text, or other such renderings.

Figure 3A:
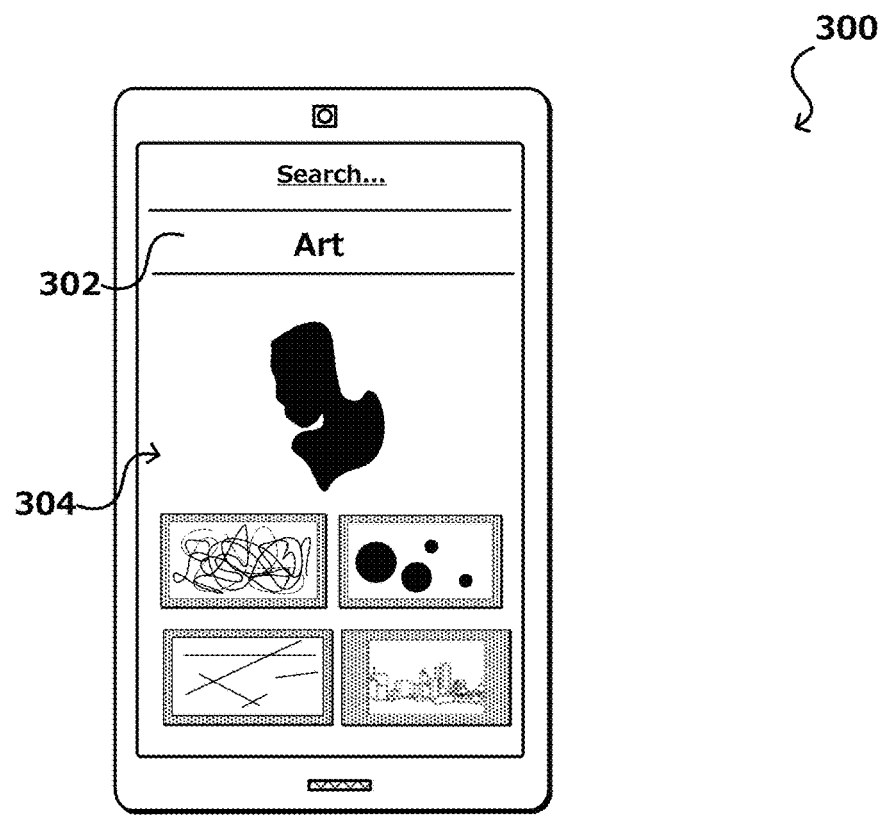
FIGS. 3A and 3B illustrate approaches to displaying content in an electronic environment, in accordance with an embodiment.

While such an approach allows a user to navigate to a product page to view the product in a desired environment, the user may desire to search for products to display within the physical space. For example, example 300 of FIG. 3A illustrates a user submitting a search query 302 for "art." In this example, the user desires to virtually preview art pieces in a physical space. To determine candidate art pieces the user can submit a search query at an electronic marketplace. In certain embodiments, the user can search for candidate art pieces or other items of interest from within the virtual environment of the physical space.

The search query, in this example, includes the search term "art." The search term can be compared to a stored set of keywords to determine matching keywords to the search term, where a stored keyword is associated with a product. In response to the search query, matching search results can be presented. The search results can be presented in any one of a number of different formats. For example, the search results can be tailored for the user, where relevant search results are presented first/higher than other search results. Tailored search results can be based on the search query, a user account that includes user preferences, purchase history of a user, search history associated with the user, a wish list associated with the user, among other such indicators of user preference. As mentioned, the search results can be arranged in order of relevance. This can include presenting more relevant search results first or higher in the search results, emphasizing more relevant search results, etc. Such a process can include determining a relevancy score for candidate search results, ranking the candidate search results based on respective relevancy scores, and presenting the search results based on the ranking. In an embodiment, the relevancy scores can be determined using one of a number of relevancy functions as are known in the art.

Figure 3B:
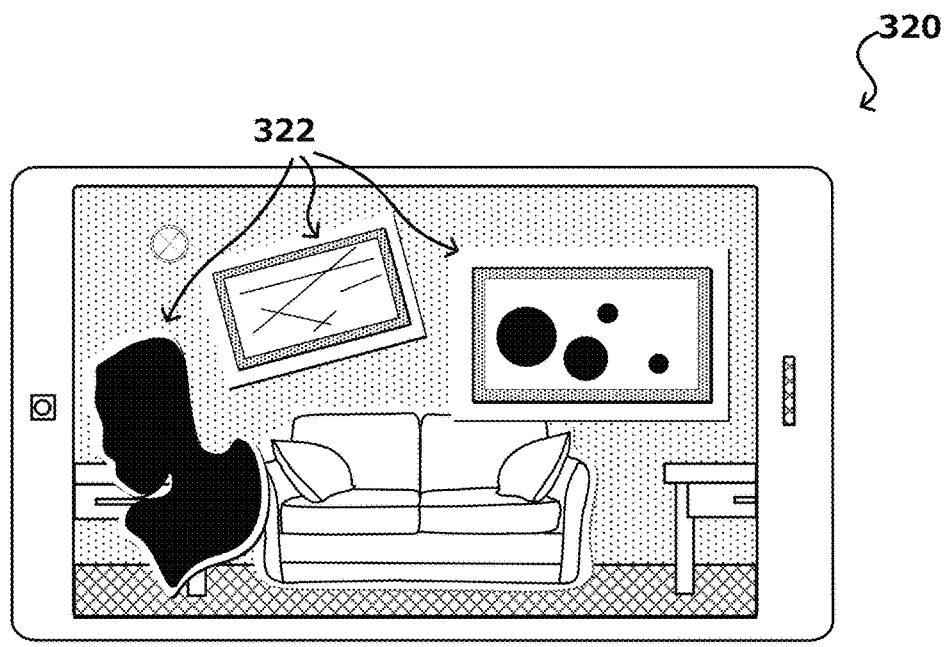

Once the user selects or otherwise indicates art pieces of interest, images or renderings of those art pieces can be placed virtually within a physical space, as represented in example 320 of FIG. 3B. For example, FIG. 3B illustrates virtual sticker renderings 322 of the art pieces placed within a live camera view of the physical space. A user can interact with the stickers. For example, the user can rotate, enlarge, reduce in size, and change the location of the virtual sticker, among other such actions. When the user is satisfied with the arrangement of virtual stickers, the user can capture a snapshot of the representation of the physical space. The snapshot can be saved, shared, annotated, etc. In some situations, annotations may be generated before capturing the snapshot of the representation of the physical space. For example, a user can use a finger or some other object to draw on the representation of the physical space and/or the stickers. In various embodiments and as described further herein, the user can generate multiple collections of virtual stickers, where the collections can include any number of virtual stickers, models or other renderings for any number of environments. Users can organize those collections as they desire. For example, the collections can be organized by environment (e.g., front room, living room, kitchen, etc.), by item type (e.g., lamps, sofas, etc.), among other such organization approaches. As described further herein, the collections can be shared where users can receive input from collaborators and other users in real-time or an asynchronous approach.

In various situations the user can move the camera from a first location to a second location (e.g., pan or otherwise move the computing device) to view additional areas of the physical space. For example, the user may pan the device from a first location to a second location of the physical space. The user may pin a first set of stickers on the representation of the first physical space and a second set of stickers on the representation of the second physical space. In this example, when the first physical space is presented, the second set of stickers is not visible because the second location which includes the second set of stickers is outside the field of view of the camera when the field of view of the camera includes the first physical space. As the user pans between the first physical space and the second physical space, the stickers remain "pinned" to respective representations of the physical space. In a "free flow mode" of operation, as the user pans the computing device, the virtual sticker appears to float over the representation of the physical space.

Figure 4A:
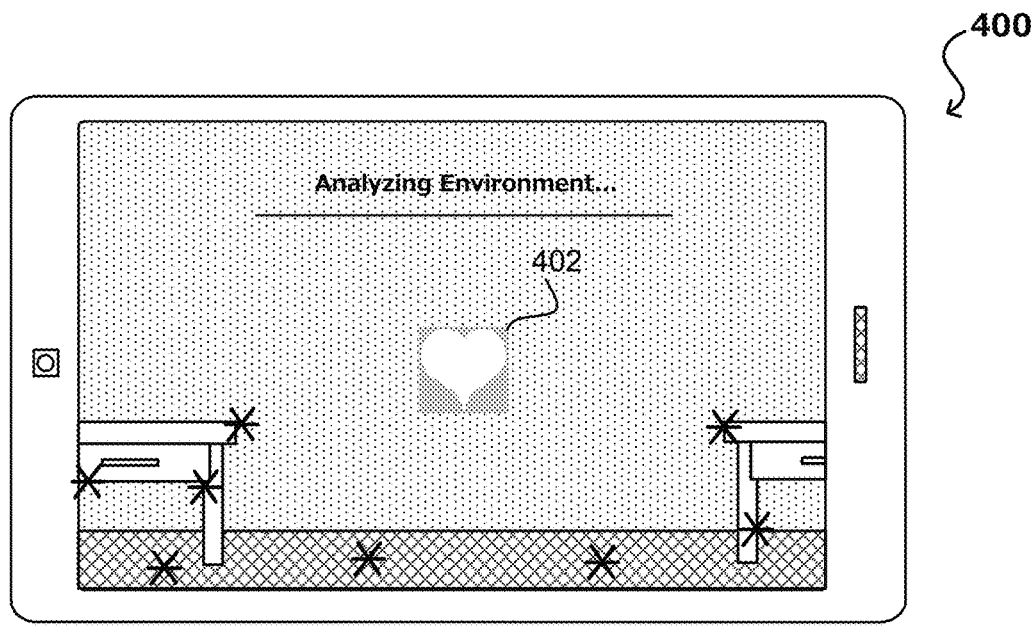
FIGS. 4A and 4B illustrate approaches to capturing data useful for recognizing a physical space for displaying content in accordance with various embodiments.

In various embodiments, the user may desire to view products relevant for a particular physical space, such as a particular room in a user's home. For example, example 400 of FIG. 4A illustrates a user selecting graphical button 402 to cause the representation of the physical space to be analyzed to determine a category or room type (e.g., front room, kitchen, etc.) of the physical space. Once a category of the physical space is determined, products or other items of interest can be displayed, and those items of interest can be placed (virtually) in the representation of the physical space.

Various embodiments can utilize a machine learning-based approach to attempt to recognize the physical space. In particular, various embodiments provide for training neural networks and other machine learning algorithms to recognize physical spaces. Once the neural network is trained, the neural network can be used to recognize a physical space. The physical space can then be processed to determine items of interest associated with the physical space. For example, in accordance with an embodiment, an image (e.g., one or more images, video, etc.) might be captured by a camera of a computing device, where that image includes a representation of the physical space. The image can be analyzed, on the client device or a remote system, to recognize the environment. Based on the recognition a category, label, or other identifier indicating the type of environment can be used to search one or more data sources to identify items appropriate for the environment. If a match is located, which corresponds to a specific product or other object, then information for that object can be returned for presentation via the client device. This can include, for example, returning information such as object name, title, pricing, reviews, photos, marketing material, and other such content.

Figure 4B:
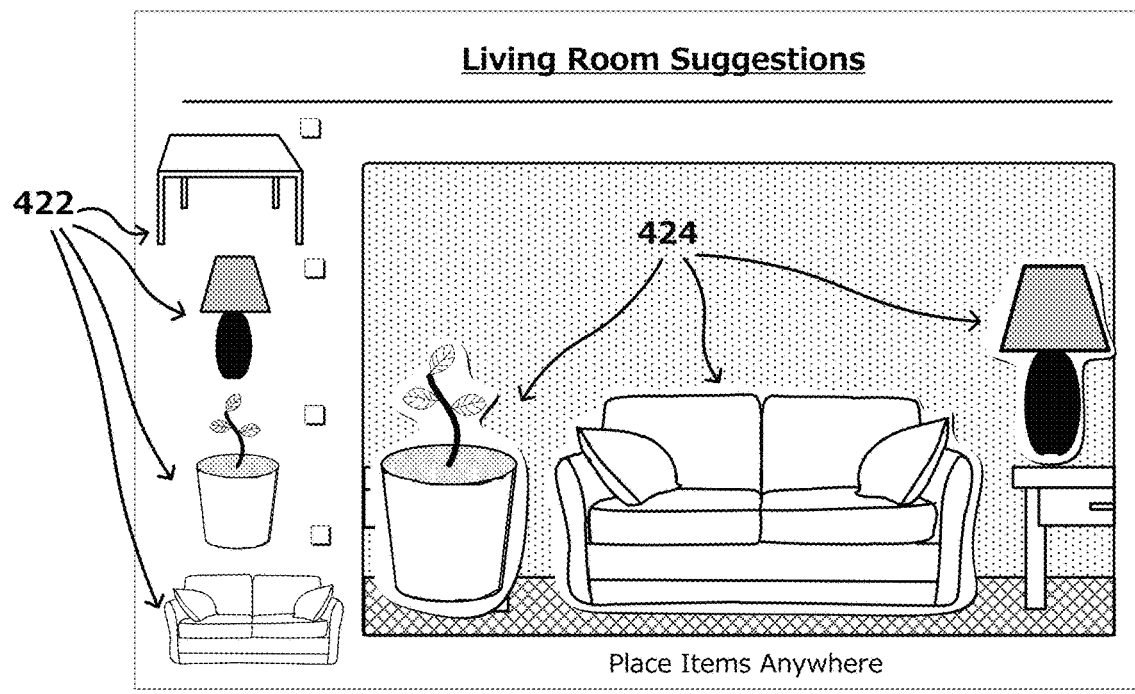

As shown in example 420 of FIG. 4B, in response to recognizing the physical space, products 422 related to the physical space can be displayed. The user can select products or other items of interest to be placed virtually within the physical space, as represented in example 420 of FIG. 4B. The selected products can appear as virtual stickers placed virtually within the physical space. As described, a user can interact with the stickers. For example, the user can rotate, enlarge, reduce in size, and change the location of the stickers, among other such actions. When the user is satisfied with the arrangement of stickers, the user can capture a snapshot of the representation of the physical space with the stickers. The snapshot can be saved, shared, annotated, etc.

While such an approach can enable the user to view style in the room, the lack of scale does not provide any indication as to whether the selected items 424 would actually fit in that space. For example, if, instead, the image of the couch can be represented with a scale that matches the scale of the view of the scene, the customer could determine if an object such as a couch is unable to fit in the space. In some embodiments, the couch would not be allowed to be represented in that location due to insufficient space. In other embodiments, the representation of the couch might be displayed in that location but in a way such that a viewer can determine that there is insufficient space. Further, some embodiments can provide one or more graphical indicators indicating regions where two or more objects are conflicting spatially, such that the user can determine whether to select a new item, move one or more items, or otherwise make necessary or desired adjustments. If the representation of the items and space are generated using three-dimensional information, this can include verifying sufficient space and room in each direction, as well as the ability to view representations of the space when an item is moved in any of three dimensions (given restrictions such as having to be placed on a surface, etc.). Such an approach can enable the customer to view the color, fit, style, and other aesthetic aspects of the item in the potential space, as well as determining whether the item will fit in that space, its size and spacing relative to other items, and other such aspects.

In order to obtain size and dimension data in two or three dimensions, however, it can be necessary to obtain more data than can be obtained from a single, conventional image. While such an image can provide a visual representation of one view of a physical space, the representation generally will not include any dimensions or scale, such that it will be difficult to determine whether an item will actually work in that space. Further, the image will leave some uncertainty that cannot be resolved from a single image. For example, it cannot be readily determined if the couch is against the wall, if there is some gap between the couch and the wall, or if there is something behind the couch. For example, there may be a "dead zone" behind the couch, or a region for which there is no information represented in the captured image. In another example, there might be an item of furniture or other object behind the couch that is not represented in the image, which might affect the desire of the user to purchase another item if it was represented in the data available to the user. While the user taking the picture might know about the item, any other person viewing the image without physical knowledge about the current state of the space may be unaware.

Accordingly, approaches in accordance with various embodiments can attempt to obtain additional information that can be useful for determining the objects represented in a space, as well as capturing dimension and scale data for those objects. In one example, a fiducial or other object with a known scale can be placed in the space before an image is captured, such that scale in at least two dimensions can be determined. If multiple images (or video) is captured that can be stitched together, and the fiducial is placed in various places during the capture process, and reasonable approximation of scale of the space in three dimensions can be determined. In some embodiments, the images (or video) can be analyzed to attempt to recognize one or more items in a scene that have a known dimension. For example, if a certain brand of phone or console is detected then that can be used to determine scale for at least a portion of the space. Such information can also be used to classify items contained within the space. If the camera is part of a device, such as a portable phone or tablet, that has motion or position sensors, for example, the motion of the device can be used to assist with scale and dimension information, as the change in the size of a representation of an object over a determinable change in distance can be used to determine the size of the object. The motion and position information also can be used to assist in mapping out the layout of the space, as well as providing image data for different views within that space. A stereoscopic camera on such a device can also provide three-dimensional data useful for mapping, as the disparity can be used to determine distance to an item, which when combined with information about the camera and optics can be used to determine scale of an item based on the size of the representation of the item in the captured image data. Processes such as stitching, interpolation, texture mapping, and others can be used to attempt to generate a three-dimensional mapping of the space, from which various views can be rendered for a user of a computing device.

As mentioned, however, a customer capturing images with a camera that is generally kept at a certain height and from a limited range of locations can result in several dead zones in the captured data. Further, much of the distance and position data will need to be inferred from the data, as an overhead view of the data is not obtained that can provide a proper overview of the layout of the space. Thus, the usefulness of the data for space and placement purposes can be limited.

In some embodiments a customer might utilize an online tool, webpage, or other such interface to manually specify the shape and dimensions of the space. Exact size measures such as width, height, and depth of various portions of the space can be entered manually. From this information, a visual environment can be synthetically rendered that can enable virtual objects to be selected and placed into the scene according to scale. If the customer has floor plans or other physical mappings of the space, that information can be analyzed to attempt to automatically set the dimensions and parameters of the space. The customer can then have the option to make modifications and provide additional specifications about the space such as the size and positions of windows and doors etc.

In the absence of three-dimensional imaging technologies, a customer can still create a complete picture of the space using a panoramic mode of a camera or camera phone. Two-dimensional panoramic images might be analyzed to attempt to determine the underlying 3D nature of the space using various computer vision techniques. In some embodiments a camera can be used that can capture the depth of the scene for each pixel in the image using infrared (IR), laser, ultrasonic, or other such technology. The ability to obtain this type of depth information enables the recognition and placement of the objects to become technically simplified.

Figure 5:
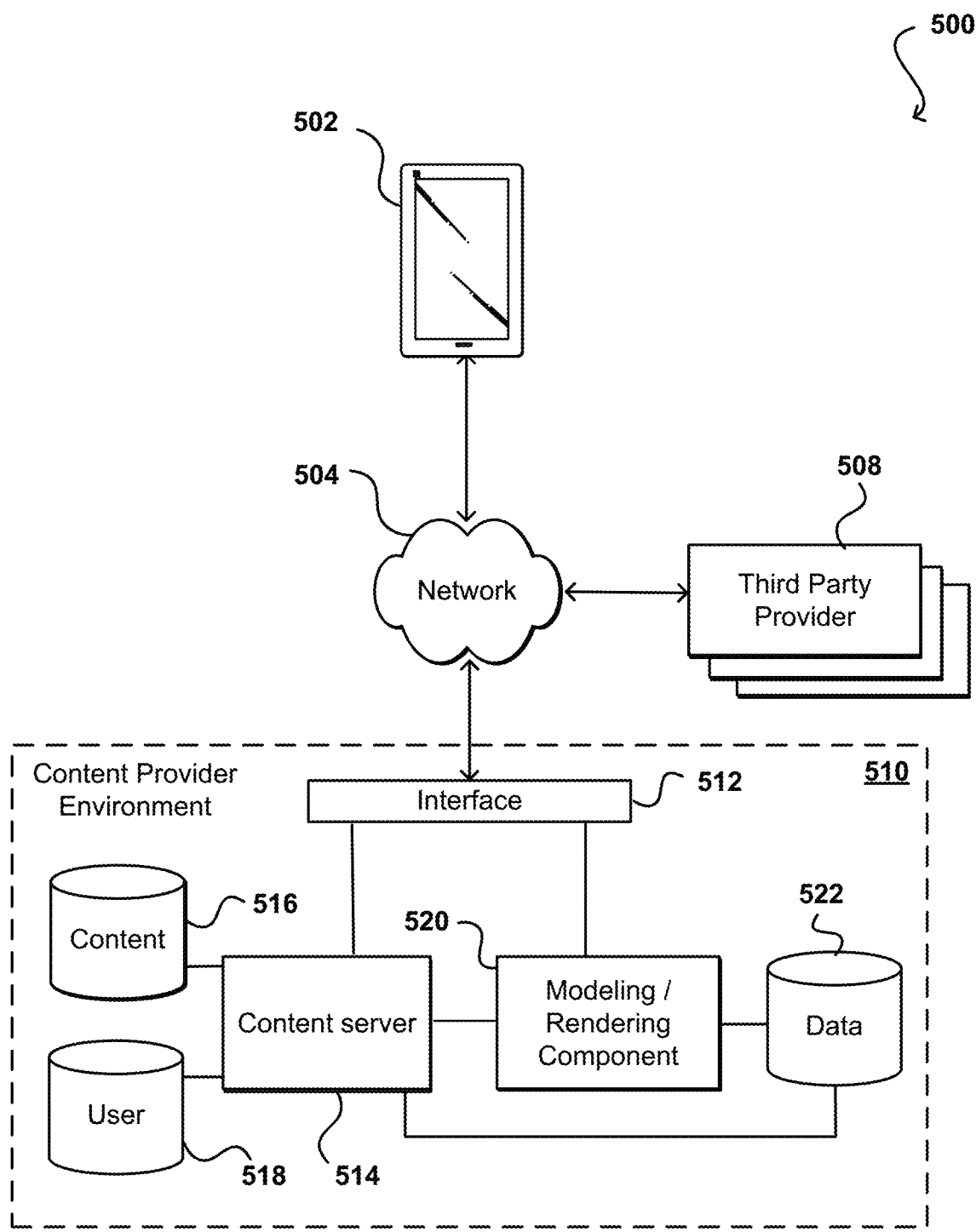
FIG. 5 illustrates an example environment in which aspects of various embodiments can be implemented.

As mentioned, information such as image and distance data can be captured by one or more devices, which in at least some embodiments can be transferred to a remote system or service that can enable other users to access views or other portions of that data. FIG. 5 illustrates an example of such an environment 500 that can be used to implement aspects in accordance with various embodiments. In FIG. 5, a client computing device 502 can submit a request for content across at least one network 504 to be received by a content provider environment 510. This can include, for example, a call from a customer wanting to establish a virtual mapping of a space or another user wanting to access views of a space for the customer, among other such options. As discussed, in some embodiments the mapping can be performed using the computing device 502 from which a mapping request is received, among other such options.

In this example, a call received to the resource provider environment 510 can be received by an interface layer 512 of the environment. As known for network environments, the interface layer can include components such as interfaces (e.g., APIs), load balancers, request and/or data routers, and the like. If the request is a request for content, such as for content including a view of a mapped space and/or object(s) to be displayed in an application, information for the request can be directed to one or more content servers 514, which can obtain the content from a content data store 516 or other such repository to be sent back across the network(s) to the computing device 502. In some embodiments, information for the request might also be compared against user data in a user data store 518 or other such location do determine, for example, whether the user has access rights to that content. In one example, the content can include a plurality of item content to be displayed as part of a set of search results or set of potential items of interest to be viewed within the virtual space, although various other types of content and uses for images can be utilized as well within the scope of the various embodiments. As described, the potential items can include renderings or stickers of products offered through an electronic marketplace.

In some cases, a request received to the content provider environment 510 might be from another entity, such as a third party content provider 508. As discussed elsewhere herein, such providers may provide images and/or virtual models and/or stickers of items to be presented to users as part of, or along with, the served content. The interface layer can determine the type of request and cause information to be forwarded to a modeling/rendering component 520 or other such system or service, which in some embodiments can cause the images to be stored to an image or model data store 522 or other appropriate location. In some embodiments, the dimensions and images for an item can be received to the provider environment, and the modeling component can analyze the data to generate a model or representation of the object that is in a format capable of being displayed with the content from the content server. Similarly, the data regarding the space can be received to a modeling/rendering component 520 that can analyze the data and generate the virtual model of the space. When a request is received from the content server for a view of the space, the modeling component in some embodiments can also generate the view, using the relevant model(s), and forward the information to the content server or the requesting computing device, among other such options. Any information associated with the images or models, such as a description or identification of one or more features of the items represented, can also be provided and stored in the data store 520. In at least some embodiments, information about features, dimensions, or other aspects of the items can be determined through components of the content provider environment, or otherwise determined. Further, in at least some embodiments, images or object models that are approved to be served as content to a user can be transferred to the content data base 516 or another appropriate location.

Figure 6:
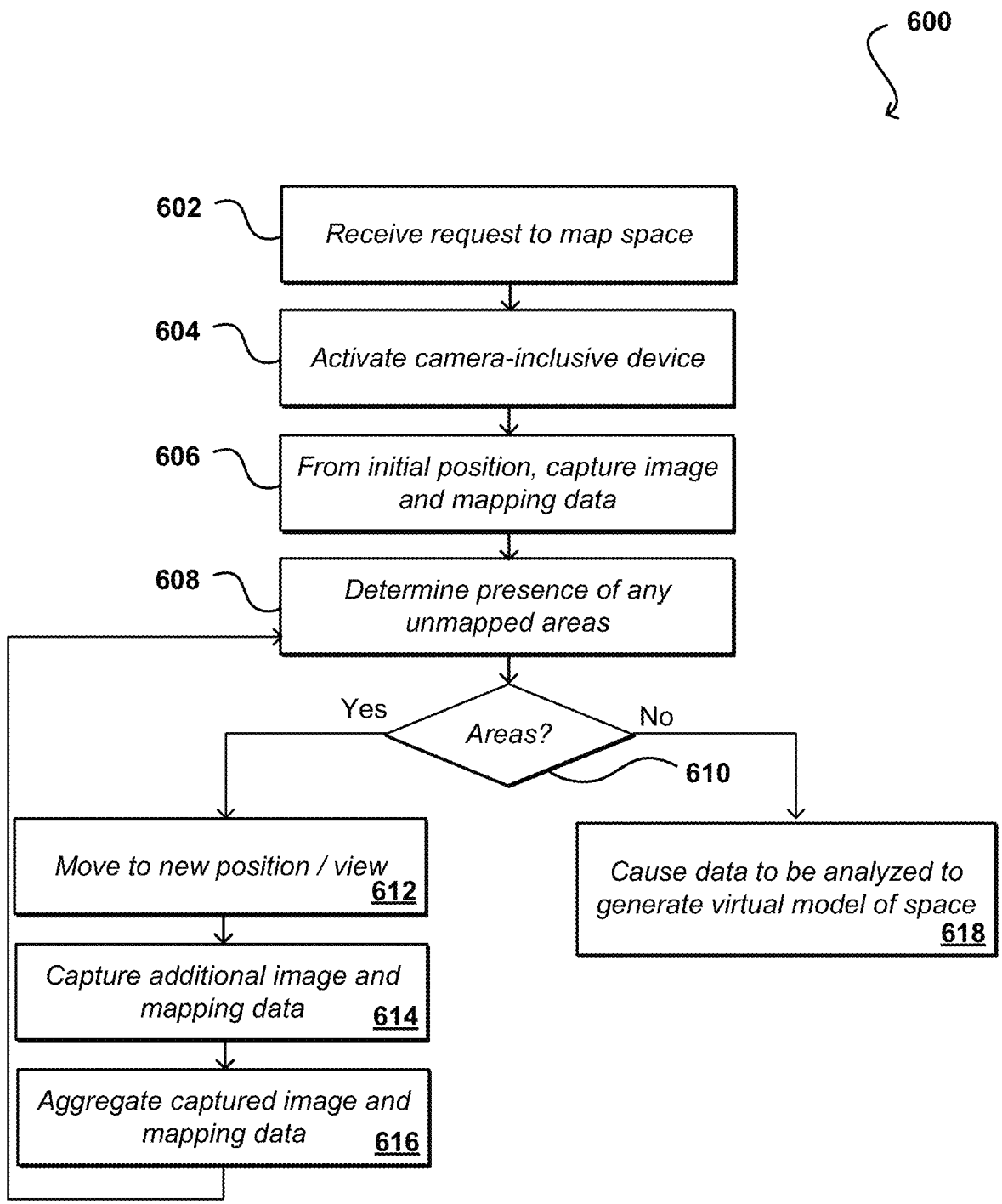
FIG. 6 illustrates an example process for modeling a physical space that can be utilized in accordance with various embodiments.

FIG. 6 illustrates an example process 600 that can be utilized in such an environment in accordance with various embodiments. It should be understood that, for this and other processes discussed herein, there can be additional, fewer, or alternative steps, performed in similar or alternative steps, or in parallel, within the scope of the various embodiments unless otherwise stated. In this example, a request is received 602 to map out a physical space. This can include a request to receive data useful for building a virtual representation of the physical space in three dimensions, for which views can be generated and served as image data (or other such data) in response to subsequent requests. In at least some embodiments this can include initializing a map file or repository for receiving image, position, distance, identifier, or other such data, and subsequently storing the map, image, and related data after map generation. In some embodiments the request can involve updating information for a previously mapped space based upon new data, recent purchases, etc.

In this example, the process can involve activating 604 a camera-inclusive device in response to the request. This can include, for example, activating or contacting control software for an overhead camera, or other such device capable of capturing data for the space to be mapped. It should be understood, however, that the request to map the space might be received to such a device, wherein activating the device can include actions such as activating a camera, etc. In this example, an initial position is determined (whether a current location of the device or a location from which the device is to begin the capture process), and image and mapping data are captured 606 from that initial position. If there is a plurality of cameras, for example, this can involve capturing image data from at least a first camera and obtaining position data for that camera, which can then be associated with the captured image data from that camera.

A determination can be made 608 as to whether there are any unmapped areas for which mapping and/or image data might be useful. This can include, for example, identifying objects in the space for which sufficient dimensions have not been obtained or potential dead zones, among other such options. For a set of overhead cameras, this can involve determining whether there are cameras for which image data has not been obtained, among other such options. In some embodiments there might be a confidence value generated as to whether adequate data has been obtained based upon the information gathered to that point and a trained classifier, for example, and the capture process can stop (or at least pause) when the confidence meets a determined threshold. In other embodiments, the process might stop when data has been obtained from each fixed camera, etc.

If there are additional areas to be mapped, or for which to otherwise obtain data, a new position or view can be determined and the process can move to that position or view. For a set of fixed cameras, this can include activating a camera at a determined position for data capture. For a moveable camera, this can include determining a location and/or orientation to which to move the device (or have a user move the device) in order to obtain the desired view. This can involve, for example, moving to a new area until a bounded region is determined, moving to an area to obtain data for a potential dead zone, moving around an object to obtain enough data to model that object, etc. At that position (as well as potentially along the way to that position) additional image and/or mapping data can be captured 614 or otherwise obtained, and that data can be aggregated 616 with the already captured data for use in generating the virtual representation of the space. When it is determined that the space has enough data for mapping, at least for a first pass, the data can be caused 618 to be analyzed, whether on the device, on a remote system or server, or at another appropriate location. In some embodiments the mapping process can begin as soon as any portion of the data is received. As mentioned, the mapping process can depend at least in part upon the type(s) of data received. In at least some embodiments, the position and/or distance data can be used to generate a virtual model (e.g., wire frame model) of the space, and the image data can be used to provide the visual overlay (i.e., through texture mapping) of the elements in the wire model. Various other graphics modeling approaches can be used as well as are appropriate for such purposes. In at least some embodiments the wire frame model can be generated in an offline process, before a view request is received, and the texture mapping process can be performed for the appropriate view in response to a subsequent view request.

Once a model of a space is generated, views of that space can be generated for any of a variety of purposes. As mentioned, one such purpose involves enabling a user to obtain various views of the space, as well as to enable the user to select potential items of interest to view how those items would look in the space. If the dimensions of the space and items are known, and appropriate models and/or views of the items are obtainable, the views of the object in the space can be to scale and can enable the user to determine whether the item would fit in a specified location in the space, as well as whether the user likes the way the item looks in the space. The user can potentially place multiple items at different locations in the space and rearrange those items until the user is satisfied with some or all of the selections, at which point the user can choose to purchase those items, request those items, add those items to a wish list, or perform another such action.

In another such approach, a markerless initiation approach can be utilized to estimate characteristics (e.g., scale, orientation, etc.) about a physical space and objects contained within as part of an approach for viewing images or renderings of items placed virtually within the physical space. Such a rendering, e.g., a camera view, of the physical space includes one or more digital representations of objects that appear to exist in the physical space as viewed in the camera view. For example, a digital representation (e.g., virtual sticker, a virtual object, a model, etc.) can be a graphical depiction and/or representation of a physical object, such as a piece of furniture, a decoration, a piece of art (e.g., sculpture, sketch, painting, photograph, poster, etc.), an appliance, a textile (e.g., rug, curtains, bed sheet, etc.), a wall, a household item, etc.

In this example, an augmented reality (AR) application is initialized by capturing image data of a physical space. For example, a user may have a mobile device with an image capture device (e.g., a camera), and begin by taking a picture or video of the physical space desired to be "augmented" with digital representations. The image capture device can be capable of receiving a stream of image data (e.g., a live video stream) and displaying the stream of image data on a display (e.g., the mobile device screen, one or more external displays, AR goggles, display-capable eyewear such as glasses or contact lenses, a virtual reality interface, etc.).

A user of the device communicably connected to the image capture device can be prompted to hold the device still. A graphical user interface (GUI) element may be displayed such as a progress bar that indicates that the initialization process has begun. Once the process begins, data is received from various motion detecting devices, such as an inertial measurement unit (IMU) of the device, which may comprise components such as a tri-axis gyroscope, a tri-axis accelerometer, etc., although any number and configuration of such components is envisioned. The motion of the device is monitored, and if the device is determined to have moved more than a threshold amount (e.g., by a reading from the gyroscope exceeding a threshold value, etc.), then the process is paused until the device is still (e.g., any motion of the device detected by the IMU is associated with data values below the threshold) and the user notified (e.g., via a dialog box and the progress bar stopping) that the device was moving too much and to keep the device still. The process may be aborted if motion of the device cannot be brought to an acceptable level within a certain amount of time, or if the user indicates a selection to cancel the process.

The data can be received from the motion detecting components (e.g., an IMU, etc.) during periods where the device is "still." After a minimum amount of time that the device is determined to be "still," values from the one or more motion-detecting components received during all or some of that period are evaluated in order to determine a sensor bias value or other such value. For example, values from a gyroscope during a ten-second period of "stillness" are collected and averaged over the ten-second period in order to supply a sensor bias value. Other data analysis approaches to determine a sensor bias value from readings collected from the device are envisioned; for example, a rolling average, a smoothed logarithmic function, comparison to a known distribution in order to determine error bounds, etc.

After determining a sensor bias value, a user is prompted to point the image capture device at a surface (e.g., a planar surface such as a table, a wall, a painting on a wall, a book on a table, a container, etc.). A GUI element such as a "target" or "focus area" comprising a subset of a display screen on which the stream of image data being captured from the real-world environment is being displayed is presented to a user in order to allow the user to "place" the desired planar surface in the target area for processing. A user captures image data of the physical space and some or all potential planar surfaces are automatically identified and visually indicated in a GUI of a device. A user captures image data of the physical space and provides an indication of a selection of one or more areas of the image data that the user would like to have evaluated for the presence of a suitable planar surface, or identifying a desired planar surface, etc. For example, a planar surface selected by the user will have a digital representation of an object "placed" on it in an augmented reality view.

A planar surface in the image data is evaluated for the presence of adequate features. For example, a user may capture image data of the real-world environment that includes a table with a book placed on the table surface. One or both of the table surface and/or book cover may be evaluated by one or more feature detection algorithms (e.g., interest point extraction, regions of interest points, edge detection, ridge descriptor analysis, FAST, MSER, PCBR, etc.) to determine if the planar surface is a feature-rich surface; i.e., a flat object or plane with complex intensity patterns. In an embodiment, the planar surface(s) have at least a minimum threshold set of features in order to be determined to be suitable to proceed.

Additional image data is captured of the feature-rich planar surface. For example, two or more views of the planar surface are captured from two or more positions around the planar surface. These additional images may comprise still images, frames of a live video stream, etc. In an embodiment, a GUI prompt is provided for display that instructs a user to move left or right around the planar surface while keeping the planar surface in view of the image capture device, and the additional image data may be manually or automatically captured.

Once a threshold number of additional images (e.g., still images, frames, etc.) are captured, then a baseline traversed during capture of additional images is determined; for example, the spatial distance between two of the camera views. By capturing the same object from different distances, positions, angles, and/or views, a multi-view stereo model may be generated that allows an estimation of a 3D geometry of the planar surface. For example, the 3D geometry may include data indicating a size and/or scale of the planar surface(s), which when evaluated along with the sensor bias value, allows for accurate sizing and rendering of a digital representation into the augmented reality display of the real-world environment in a "camera view" displayed on a device. For example, a camera view of the physical space may be displayed that includes a rendering of the physical space including the planar surface as captured by an image capture device (e.g., a live video stream), and a digital representation of an object displayed as if the object were sitting on the planar surface, with the digital representation of the object being rendered at a realistic scale in substantially real-time based on the physical dimensions of the actual object and the scale information (e.g., of the planar surface).

While such approaches enable the customer to obtain views of how items would look in that space, in at least some embodiments other users can view item content in that space as well. For example, a customer might want design help from friends or family, and can provide them a link (or other access mechanism) for obtaining a view of the space. A customer might also seek out design help from others, whether third party designers, designers associated with a provider, the general public, a social network, and the like. These users can suggest items, sets of items, or even complete looks for the space, which the customer can then view and approve, purchase, or otherwise utilize. In some embodiments, users might be able to view the suggestions or designs of others and provide feedback, such as by voting, providing a rating, or giving a thumbs up/down, among other such options.

Figure 7A:
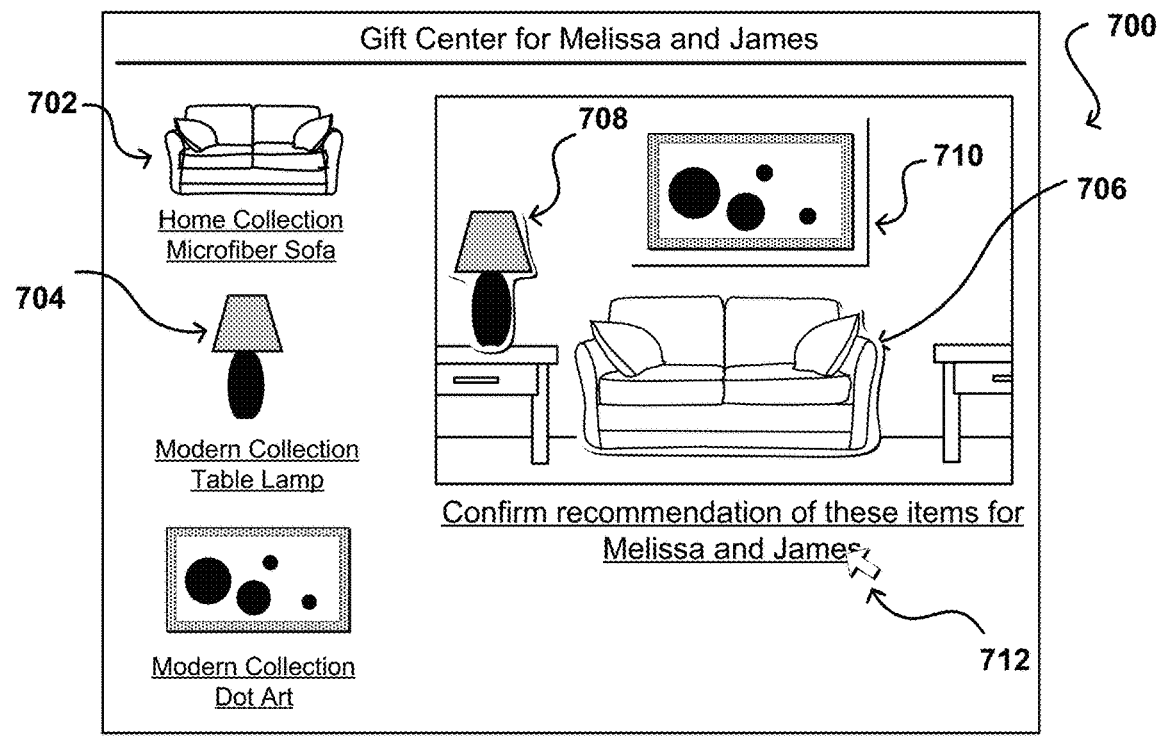
FIGS. 7A, 7B, and 7C illustrate an example approach to enabling a first user to suggest items for a second user that can be utilized in accordance with various embodiments.

In the example situation 700 of FIG. 7A, a customer has registered with a gift center or other such option, whereby users can obtain views of spaces such as rooms in the customer's house, and can offer to purchase items for the customer for those spaces. These items can be from a list that the customer has provided, or can be at the discretion of the user. For example, in FIG. 7A, a user has selected two items 702, 704 that the user thinks look nice in the space and are at a price point with which the customer is comfortable. The user could have first obtained a view 710 of the space, whether by navigating a model of the space or by selecting a view designated by the customer. In certain embodiments, view of the space may be a real-time view or live camera view of the space, where the customer can interact with a live view of the customer's space. In any situation, the user can then view content for various items, such as by selecting thumbnail images 702, 704 from a list and then arranging the corresponding virtual stickers 706, 708 in the view of the space. Once the user is happy with the selection and placement, the user can select an option 712 to suggest these items to the customer. In the situation where the customer and user are interacting in real-time or substantially real-time, the user can select an option to indicate that customer has completed selection and placement. In some embodiments this can just be a suggestion, and if the customer likes the suggestion then the customer can proceed to purchase the items. In various embodiments, the user can offer to purchase the items for the customer subject to the customer's approval. Further, the placement can be based upon user movement of the various items, or can be based upon placement options provided to the user, whereby the user does not need to spend time manually positioning and moving items, but instead can cause the items to "snap" into one or more different locations, and potentially cycle the placement of the items between those places.

Figures 7B, 7C:
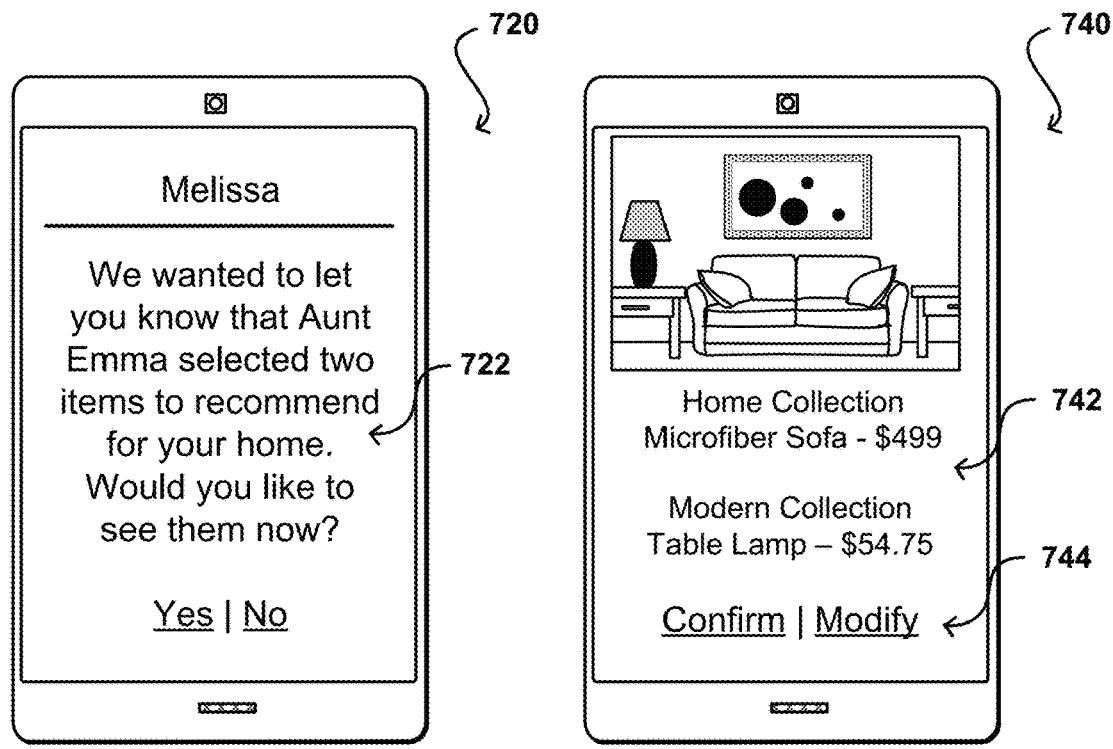

Once the user confirms the selection a notification 722 might be sent to the customer to notify the customer of the selection, as illustrated in the example situation 720 of FIG. 7B. The notification can include a link, option, or instructions for accessing a view 740 of the selections and the space, as illustrated in FIG. 7C, whereby the customer can determine whether or not the customer likes the suggestion and/or wants any or all of the items. If the customer does not like any of the items, the customer can indicate that the customer does not want any of the items. For any item that the customer likes, the customer can confirm the suggestion. If the suggestion was an offer to purchase on the customer's behalf, then the item can be purchased and billed to the user. If the offer was just a design suggestion, then the customer can be billed for the item. In some embodiments the customer might have the option of selecting a similar item, with alternative items being specified by the user or located by the user. In the case where the customer would prefer a different item, the customer can indicate this preference which can be communicated to the user, whereby the user can approve or deny the change. In some embodiments the change might not require approval if at or below the cost of the suggested item, while in other embodiments there might be restrictions on the types of items selected, such as where a parent wants to ensure the money is spent on furniture for an apartment, etc. Similarly, in some cases a user can provide an amount of funding that may or may not include one or more suggestions, and the customer can choose to spend those funds as desired (unless other criteria or specifics apply to the usage, etc.). These steps can be performed synchronously or asynchronously, such as through a series of events or as part of a video conference, among other such options.

Figure 8A:
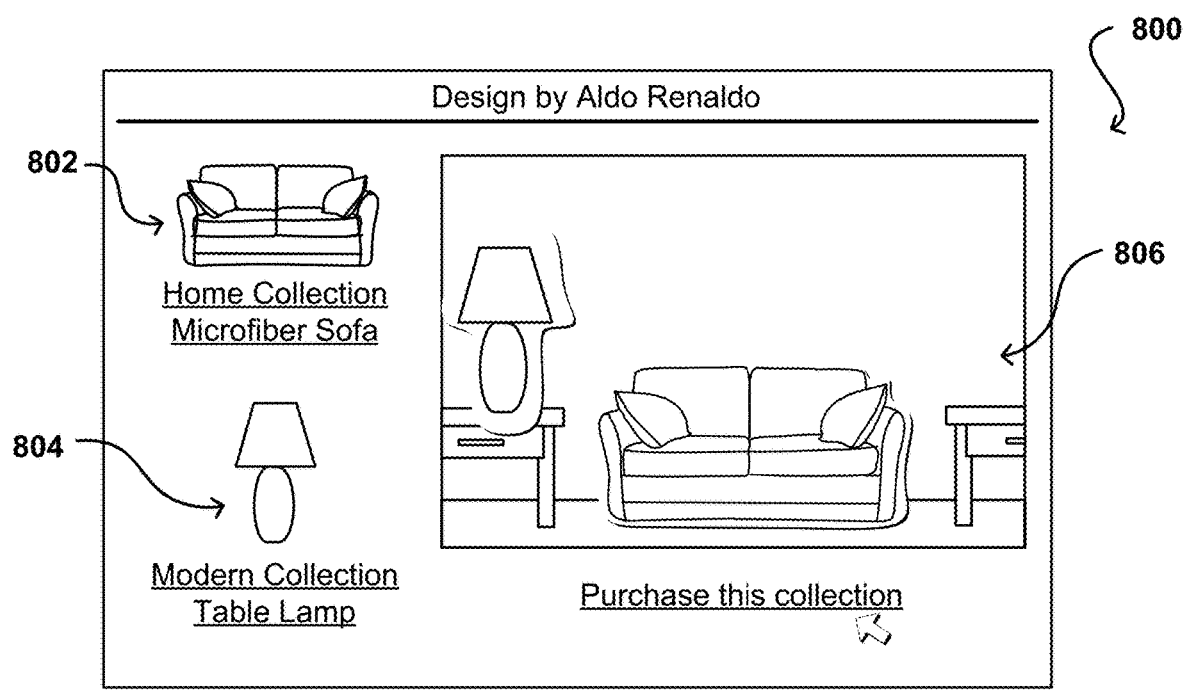
FIGS. 8A and 8B illustrate an example approach to assisting a user in selecting items for a space that can be utilized in accordance with various embodiments.
Figure 8B:
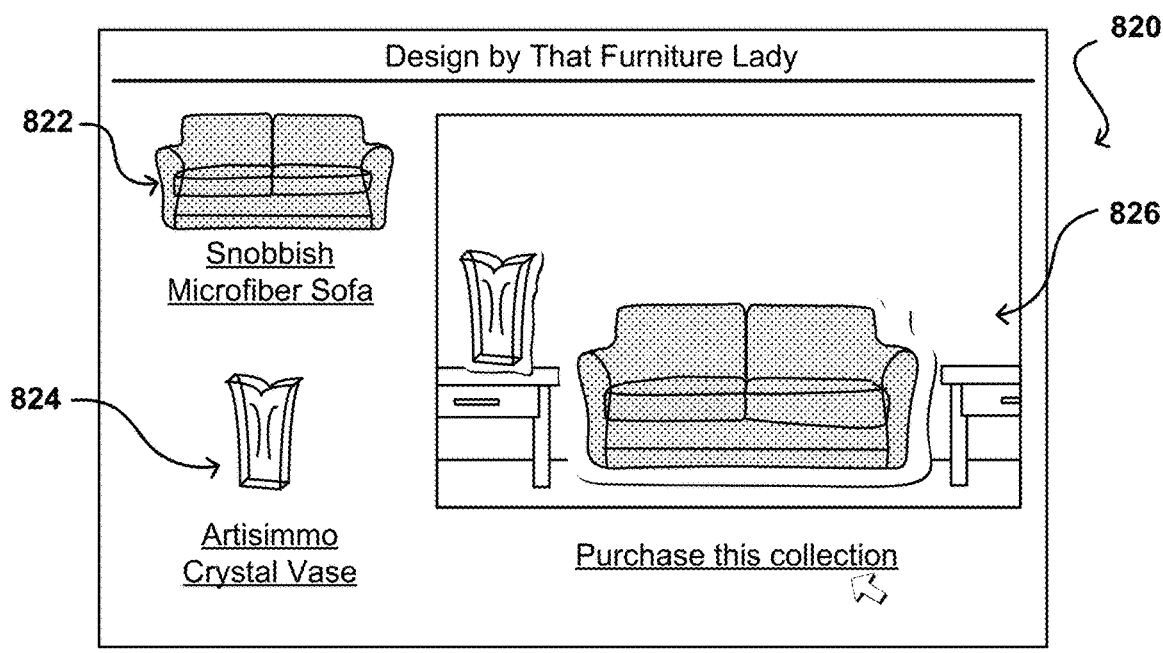

As mentioned, in some embodiments the customer might instead request that others help design the space by selecting items, placements, colors, and other such options. For example, in the situation 800 of FIG. 8A a first designer has selected a first pair of items 802, 804 as represented in the display, and placed them in specific locations in a view of the space 806. Similarly, in the situation 820 of FIG. 8B a different designer or other such entity (e.g., a friend or family member) has proposed a different set of items 822, 824 for the customer space 826. The customer can switch between these views 806, 826, and if the customer likes either of the suggestions the customer can select to purchase those items. If the designer is associated with the content provider or another such entity, the designer might get some credit or other type of commission for helping with the transaction. In some embodiments, designers (or other persons or entities) can arrange sets of items that can be used to design a space. In such a situation, a customer might choose one of these collections and place items from the collection in the virtual space in order to quickly design the room with items that go well together.

In at least some embodiments, a customer can have the ability to request that others help with the design process. For example, a customer can cause a request to be sent to one or more specified people, such as friends or family, whereby that person is requested to help with the design process. That person can then obtain a view of the space, such as by logging on to a corresponding website or opening a link in an application, and can have the ability to suggest and/or select items for that space, which can then be reviewed by the customer. For example, a customer can post a request on a social networking site (or blog or feed, etc.) whereby friends, followers, connections, or other such members can select to provide suggestions for the customer. Various other request approaches can be utilized as well, such as through SMS, instant messaging, voice calls, email messages, and the like. In some embodiments users viewing a website offering such functionality might be able to go to a page or location where they can suggest items, designs, or themes for other users.

In some embodiments anyone receiving a copy of the link or invitation can provide suggestions, while in other embodiments only specific users or types of users might be able to provide suggestions, in order to minimize the likelihood of spam or other undesirable behavior. In some embodiments each user can provide a unique suggestion, while in other embodiments there can be virtual workspaces where multiple users can make suggestions and changes such that the design can effectively be crowdsourced. In such an instance, there might be options for different items for the same space and design as may have been provided by different users. In one such example, a user receiving a request can logon to the site to view the current version of the design, as may have been provided and/or updated by one or more other users. In this example, the user can obtain a view of the current design for the space, and can also view or search for content relating to other items that could potentially be used in that space, either along with, or in place of, one or more objects of the current design. The user can also select options to perform tasks such as giving feedback on the current design or saving any modifications as a new version of the design. In some embodiments, users might be able to view any or all of the versions, while in other embodiments only the current version may be available. When another user logs onto the site, that user can get a different view reflecting the current version after any updates, and can potentially receive a different selection of items that can potentially be used to update the design. Various options can be provided for this user as well. Such a process enables the design to be collaborative, and enables the customer to keep the design process open until such time as the customer is satisfied with the design, etc. In various embodiments, this collaborative process can be performed synchronously or asynchronously, such as through a series of events or as part of a video conference in real-time, among other such options.

Users can also have the ability to rate the designs or individual design choices, among other such options. For example, users might be able to vote for their favorite design, give a thumbs up or thumbs down to each item, give a rating to each design choice, etc. Users can also provide feedback on, or report, other users or designers in order to help control spam or abuse, among other such undesirable behavior. Each designer might have a respective profile, and in some embodiments customers can request certain designers to provide suggestions based at least in part upon their respective profiles, respective user ratings, or other such information. Users can also provide comments for various selections, whether their own suggestions or those of others. For example, a user can provide comment as to why they liked a certain item, or why they think a suggestion would go better somewhere else, etc.

Figure 9:
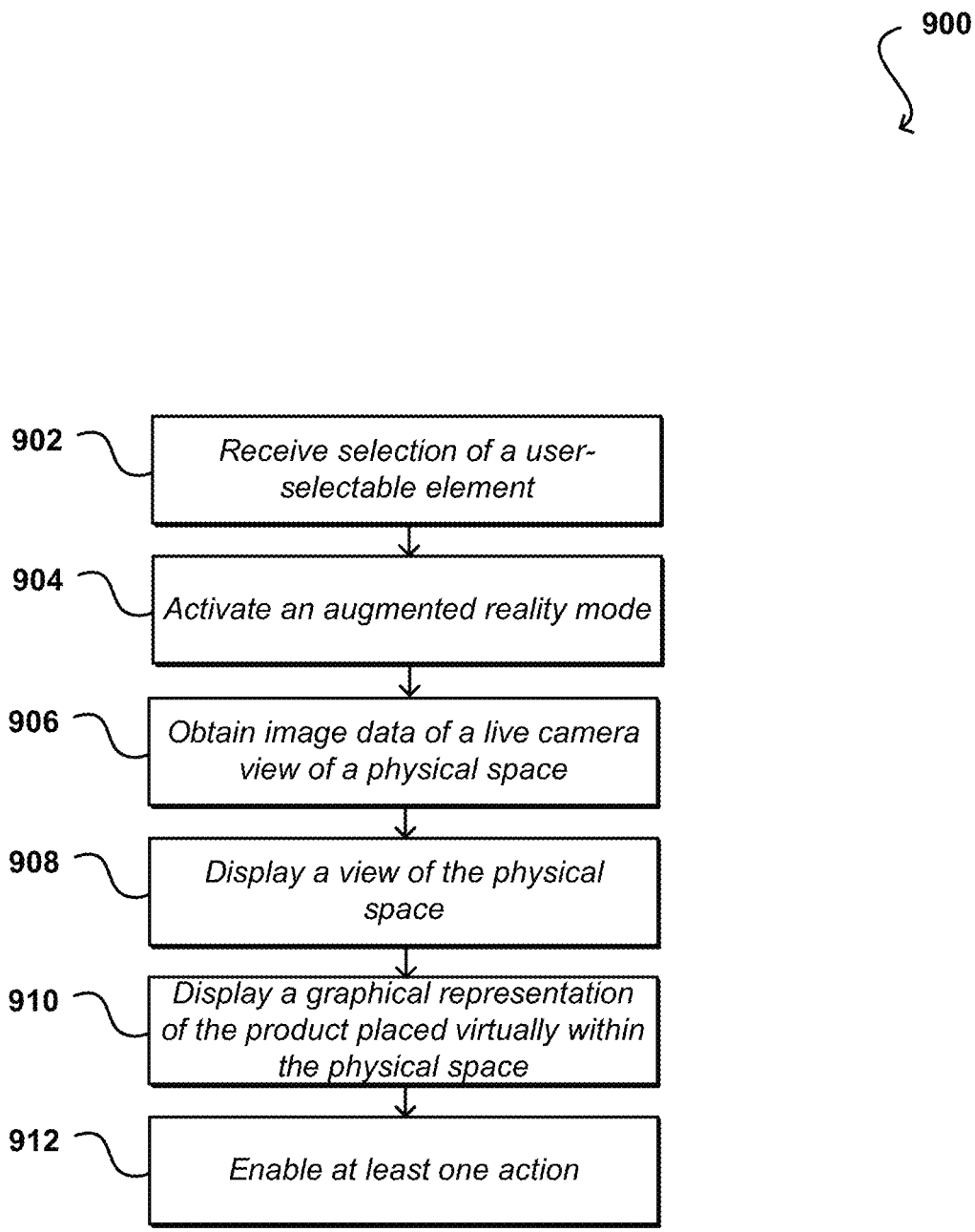
FIG. 9 illustrates an example process for viewing images or renderings of items placed (virtually) within a physical space that can be utilized in accordance with various embodiments.

FIG. 9 illustrates an example process 900 for viewing images or renderings of items placed (virtually) within the physical space in accordance with various embodiments. In this example, a selection of a user-selectable element is received 902 to activate 904 an augmented reality mode or other such camera view of a physical space. The user-selectable element can be located on a product page offered through an electronic marketplace or other such electronic storefront. The user-selectable element may be represented as a virtual button, link, or other selectable element.

Once the augmented reality mode is activated, image data (e.g., multiple still images, video, live image data, etc.) of the live camera view of the physical space is obtained 906 and a camera view (e.g., an augmented view) of a view of the physical space is displayed 908 on the display screen. The live camera view can correspond to a field of view of the camera and includes the physical space. In various embodiments, as the live camera view is captured, a globalization and localization process can be performed where a map of the physical space can be determined and the map can be utilized to "stick" virtual stickers to the representation of the space as well as provide a scaled view of the items with respect to the environment. As described, this can include building a virtual representation of the physical space in three dimensions, for which views can be generated and served as image data (or other such data) in response to subsequent requests. In at least some embodiments this can include initializing a map file or repository for receiving image, position, distance, identifier, or other such data, and subsequently storing the map, image, and related data after map generation. In some embodiments the process can involve updating information for a previously mapped space.

As the user pans or otherwise moves the camera such that a different area of the physical space is within the field of view, the representation of the physical space presented on a display screen of the computing device can be updated. The camera view can display a graphical representation such as a virtual sticker or other such rendering of the product placed virtually within the physical space on the display screen of the computing device. As described, the graphical rendering can include a representation of the product as well as additional content, such as a border, a drop shadow, animations, filter effects, etc. The border can be represented as a colored area that includes the representation of the product, where any appropriate color may be used. The shape of the border may generally track the shape of the product but can be any shape. The border may have a particular set width or may be adjusted based on the size and/or position of the graphical rendering or other such factors such as dimensions of the product. A drop shadow or other shadow effect may be applied to the border and/or representation of the product. The shadow effects may be dynamic and update with respect to a position and/or intensity of a physical and/or virtual light source. Various algorithms may be implemented to generate such effects. In certain embodiments, the graphical representation may present one or more animations, filter, or sound effects as is known in the art. For example, as the user interacts (e.g., moves, resizes, etc.) with the graphical rendering these effects may be activated. Other events may also trigger use of these effects.

Once a model of a space is generated, views of that space can be generated for any of a variety of purposes. For example, the user can potentially obtain and place multiple virtual stickers, models or other such renderings of products at different locations in the space and rearrange those virtual stickers until the user is satisfied with some or all of the selections. The virtual stickers can appear to stick or snap to the various views of the physical space. Additionally, as described, the user can search for products, receive a recommendation of products, request a recommendation for products as well as placement of those products, etc. At least one action can be enabled 912 with respect to the items. For example, the user can choose to purchase those products, request those products, add those products to a wish list, capture a snapshot of the physical space including the placed virtual stickers, share the snapshot, generate multiple collections of virtual stickers having any number of renderings for any number of environments, among other such actions.

Figure 10:
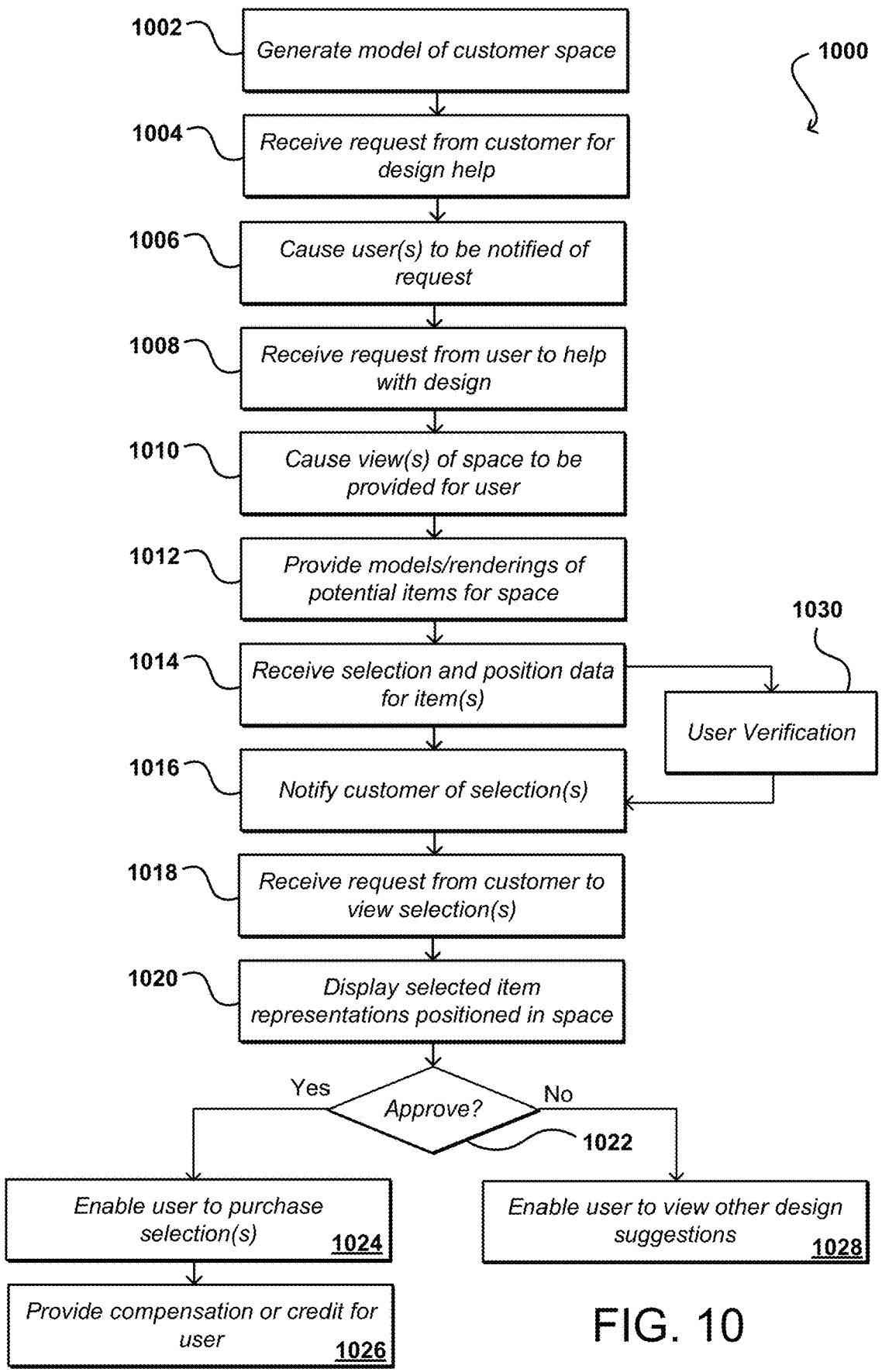
FIG. 10 illustrates an example process for that can be utilized in accordance with various embodiments.

FIG. 10 illustrates an example process 1000 for of an action that can be enabled; namely enabling a collaborative design process that can be utilized in accordance with various embodiments. In this example, a model of a customer space (such as a living room, nursery, home, or office) is generated 1002 or otherwise obtained, such as by using any of the approaches discussed or suggested herein. As mentioned, data for the model can be stored such that views can be rendered from the model for display to an authorized user or other such entity. In various embodiments, this collaborative process can be performed synchronously or asynchronously, such as through a series of events or as part of a video conference in real-time, among other such options. In this example, a request is received 1004 from a customer, where the customer would like assistance with the design of the room. This can include, for example, selecting and placing products in the room. In response to the request (or as part of the overall design process), one or more users or other persons or entities can be caused to be notified 1006 of the customer request. This can include, for example, sending notifications to friends of the customer, posting a notification on a website of the provider, sending a request to a set of professional designers, adding a link to a social networking site, or other such mechanisms discussed and suggested herein. In response, a request can be received 1008 from a user wanting to assist with the design. In some embodiments an authorization, authentication, verification, or other such process can be utilized to ensure that the user should be allowed to have access to the data, as many customers may not want unknown users being able to access information such as a layout of the customer's home or office, as well as a view of its contents. If the user is determined to be able to receive the information, one or more views of the space can be caused to be provided 1010 to the user. This can include, for example, enabling the user to select from one or more set views of the space, enabling the user to move the position of a virtual camera in order to have views rendered in the provider environment and the corresponding image data sent to the user device, or sending data to an application executing on the user device for the purpose of rendering the views, among other such options. As mentioned herein, the data can be accessed in any of a number of ways, such as through a webpage, a dedicated application, a mobile application, and the like.

In addition to views of the room or space, models, images, and/or renderings of various items can be provided 1012 to the user device, in order to enable the user to obtain scale-appropriate views of the items in various locations in the space. As described, the renderings can include virtual stickers, three-dimensional models, etc. As mentioned, the user can move around the renderings of the items in the virtual space, change items, potentially remove existing items from the space, etc. Once the user is satisfied with the selection and arrangement of the items, selection and position data can be received 1014, such as in response to the user selecting a submit or approval option. A notification can be provided 1016 to the customer to indicate the selection(s), where the notification can take any appropriate form such as those discussed above.

A request can be received 1018 from the customer to view the selection(s). In some embodiments there might be multiple selections from multiple different users or groups of users, as discussed herein. For a given user selection, the selected item representation(s) can be displayed 1020 positioned according to the user data. The customer can still have the ability to move around the items, add or remove items, etc. An indication can be received as to whether the user approves 1022 of any or all of the items suggested by the user. If none of the selections are approved, the user can be enabled 1028 to view suggestions from other users or entities. If any of the items are approved, the user can be enabled 1024 to purchase or otherwise obtain the approved item(s). As discussed herein, the item can be paid for by the customer, the user, or another entity in various situations. Further, in some embodiments the user who suggested the approved item(s) can receive some type of credit or compensation, such as a discount, coupon, or credit for items purchased through the provider or a related entity. In at least some embodiments the visualization data for the approved item(s) can be added to the model of the space in order to update the visualization of the space for subsequent viewers. In some embodiments, a user verification 1030 step may be performed in order to avoid automated suggestions from bots, programs, or other such sources. For example, a user might have had to view a model, perform one or more specific actions, or otherwise indicate that the user is likely a human interacting with the content and making legitimate decisions.

Figure 11:
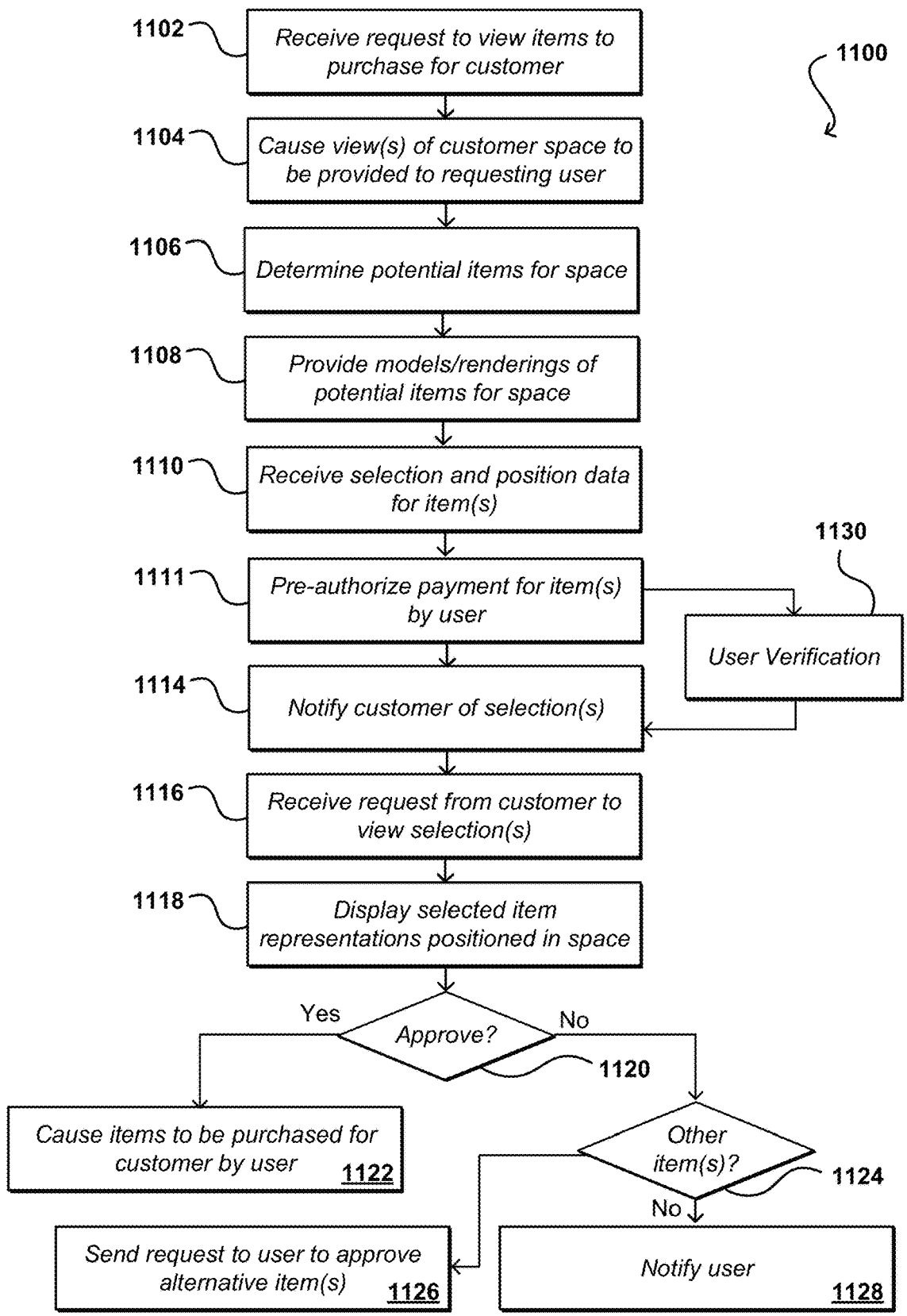
FIG. 11 illustrates an example process for that can be utilized in accordance with various embodiments.

FIG. 11 illustrates another example process 1100 that can be utilized in accordance with various embodiments. In this example, a request is received 1102 wherein a user would like to view data for items that can be purchased for a specific customer (or group of customers, etc.). This can include an offer to buy something for a birthday that might be of interest to the customer, off a registry list for a wedding or baby shower, or any other such reason. In some embodiments an authentication, verification, or other such process can be utilized to ensure that the user should be allowed to have access to the data as discussed herein. If the user is determined to be able to receive the information, one or more views of the space can be caused to be provided 1104 to the user as discussed above. Potential items for the space can be determined 1106, such as by analyzing customer data, analyzing a wish list or registry, determining items of a specified category or style, etc. Various mechanisms exist for recommending items based on various criteria that can be utilized with such a process. Models, images, and/or renderings of various items then can be provided 1108 to the user device, in order to enable the user to obtain scale-appropriate views of the items in various locations in the space. As mentioned, the user can move around the renderings of the items in the virtual space, change items, potentially remove existing items from the space, etc. Once the user is satisfied with the selection and arrangement of the items, selection and position data can be received 1110, such as in response to the user selecting a submit or approval option. In this example, payment for the item(s) is pre-authorized 1112 for the user, such that if the customer approves the user can be automatically charged for the approved items and the items shipped to the customer (or the user to give as a gift, etc.). A notification can be provided 1114 to the customer to indicate the selection(s), where the notification can take any appropriate form such as those discussed above.

A request can be received 1116 from the customer to view the selection(s). In some embodiments there might be multiple selections from multiple different users or groups of users, as discussed herein. For a given user selection, the selected item representation(s), e.g., virtual sticker representations, can be displayed 1118 positioned according to the user data. The customer can still have the ability to move around the items, add or remove items, etc. An indication can be received as to whether the user approves 1120 of any or all of the items suggested by the user. If any of the items are approved, the items can be caused to be purchased 1122 for the customer with payment being provided by the suggesting user. If none of the selections are approved, the customer can have the option of providing alternative item suggestions for the user. If other items are suggested 1124, a request or notification can be sent to the user to approve or deny the alternative items, which then can be purchased for the customer by the user. If no alternative items are suggested, the user can be notified 1128 that the customer denied the suggestions. In at least some embodiments the customer can have the ability to provide a note or select a reason as to why the suggestion was rejected, such as another user purchasing a similar item for the customer, etc. This can enable the customer to reject an item without (hopefully) insulting or hurting the feelings of the suggesting user. In some embodiments, a user verification 1130 step may be performed in order to avoid automated suggestions as discussed above.

As mentioned, there can be various ways to determine which items to suggest for a customer space. In at least some embodiments, these can include autosuggestions based at least in part upon items purchased by the customer, items purchased by others having similar items in a similar space, items having similar features (brand, style, designer) to items purchased by the user, and the like. These can also be based upon the size of the space, colors of the space, and other determinable aspects. In some embodiments past recommendations for the customer that were approved or denied can be used to determine how likely a customer is to like a particular item. Some embodiments can utilize various collaborative filtering techniques to attempt to learn patterns in suggestions and purchasing. The patterns can also be learnt using either "midlevel" feature cues such as texture, edges, and shapes, or rather "high level" feature cues such as objects interactions and classes. This allows for better fulfillment center provisioning, as well as providing deals to make these commonly-purchased items more "desirable" to customers and other users.

Collaborative tools in accordance with various embodiments can be used for other purposes as well, not only recreating or improving space to get better aesthetic suggestions. For example, such a tool can create a feedback channel for providers, designers, and builders to glance upon how their creations are used in the settings of people's homes, businesses, and other such settings. This will let them come up with more designs to complement their designs so far. Further, based on suggestions and questions, these entities can have their hands on the pulse of their user demographic and can design the next product to meet popular needs or fix a common issue. The entities can obtain a clear idea of how their furniture is used/placed by their customers. In various embodiments, the collaborative tools allow for collaboration to be performed synchronously or asynchronously, such as through a series of events or as part of a video conference in real-time, among other such options.

Figure 12:
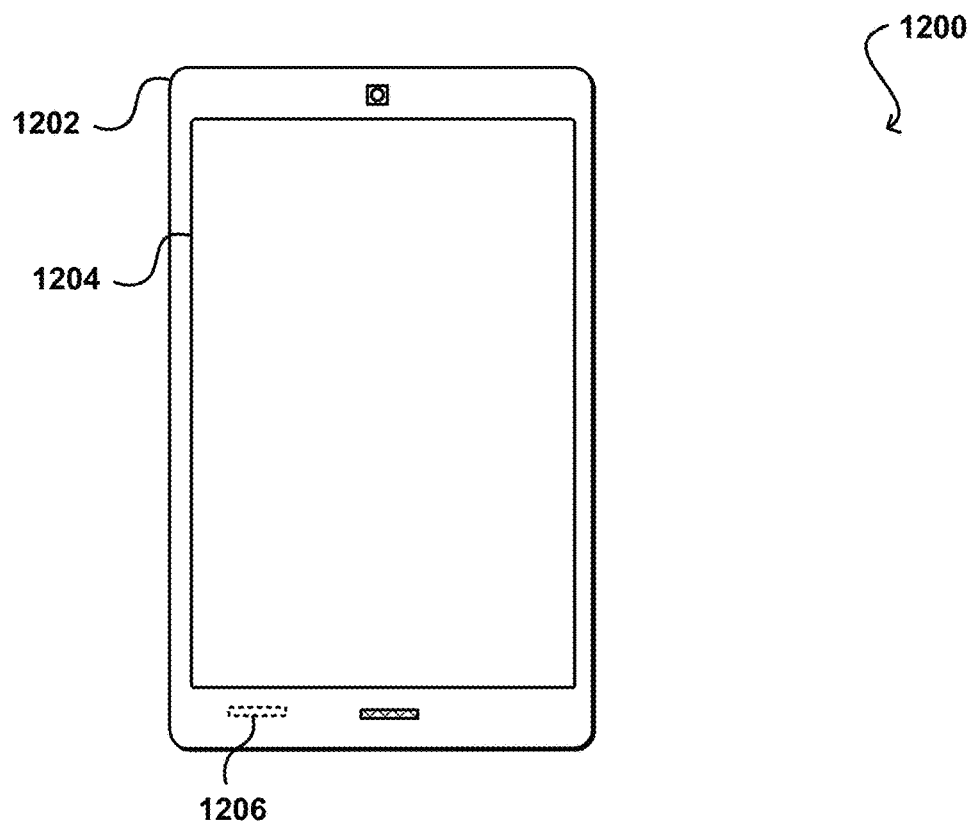
FIG. 12 illustrates an example computing device that can be utilized in accordance with various embodiments.

FIG. 12 illustrates an example computing device 1200 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others.

Figure 13:
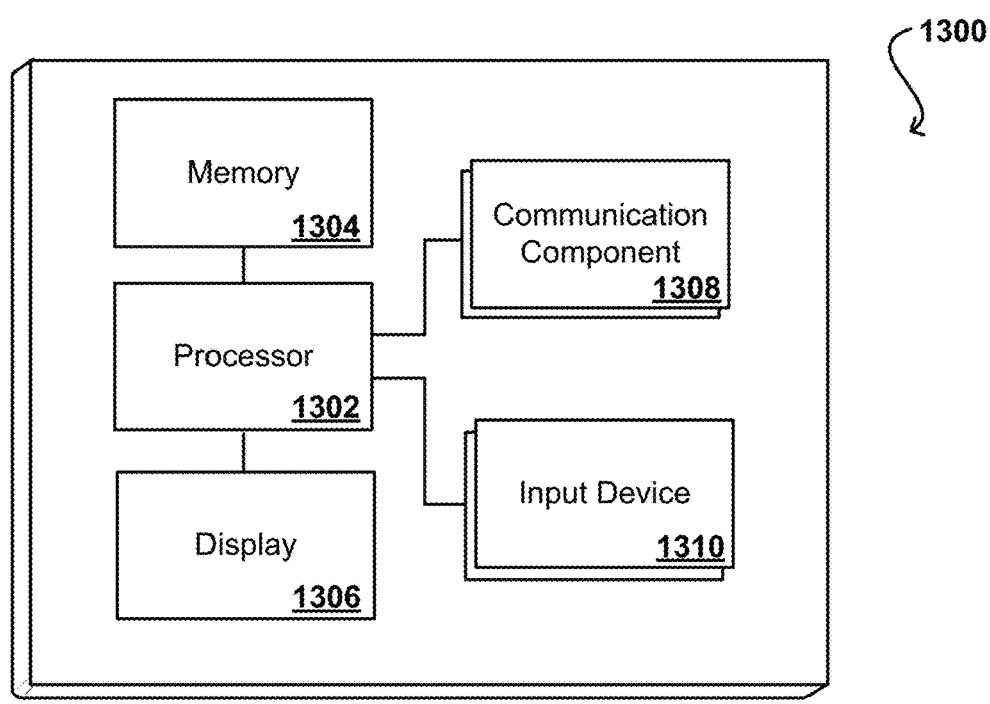
FIG. 13 illustrates an example configuration of components of a computing device, such as the device illustrated in FIG. 12.

In this example, the computing device 1200 has a display screen 1204 and an outer casing 1202. The display screen under normal operation will display information to a user (or viewer) facing the display screen (e.g., on the same side of the computing device as the display screen). As discussed herein, the device can include one or more communication components 1206, such as may include a cellular communications subsystem, Wi-Fi communications subsystem, BLUETOOTH® communication subsystem, and the like. FIG. 13 illustrates a set of basic components of a computing device 1300 such as the device 1200 described with respect to FIG. 12. In this example, the device includes at least one processor 1302 for executing instructions that can be stored in a memory device or element 1304. As would be apparent to one of ordinary skill in the art, the device can include many types of memory, data storage or computer-readable media, such as a first data storage for program instructions for execution by the at least one processor 1302, the same or separate storage can be used for images or data, a removable memory can be available for sharing information with other devices, and any number of communication approaches can be available for sharing with other devices. The device typically will include at least one type of display element 1306, such as a touch screen, electronic ink (e-ink), organic light emitting diode (OLED) or liquid crystal display (LCD), although devices such as portable media players might convey information via other means, such as through audio speakers. The device can include at least one communication component 1308, as may enabled wired and/or wireless communication of voice and/or data signals, for example, over a network such as the Internet, a cellular network, a Wi-Fi network, BLUETOOTH®, and the like. The device can include at least one additional input device 1310 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 14:
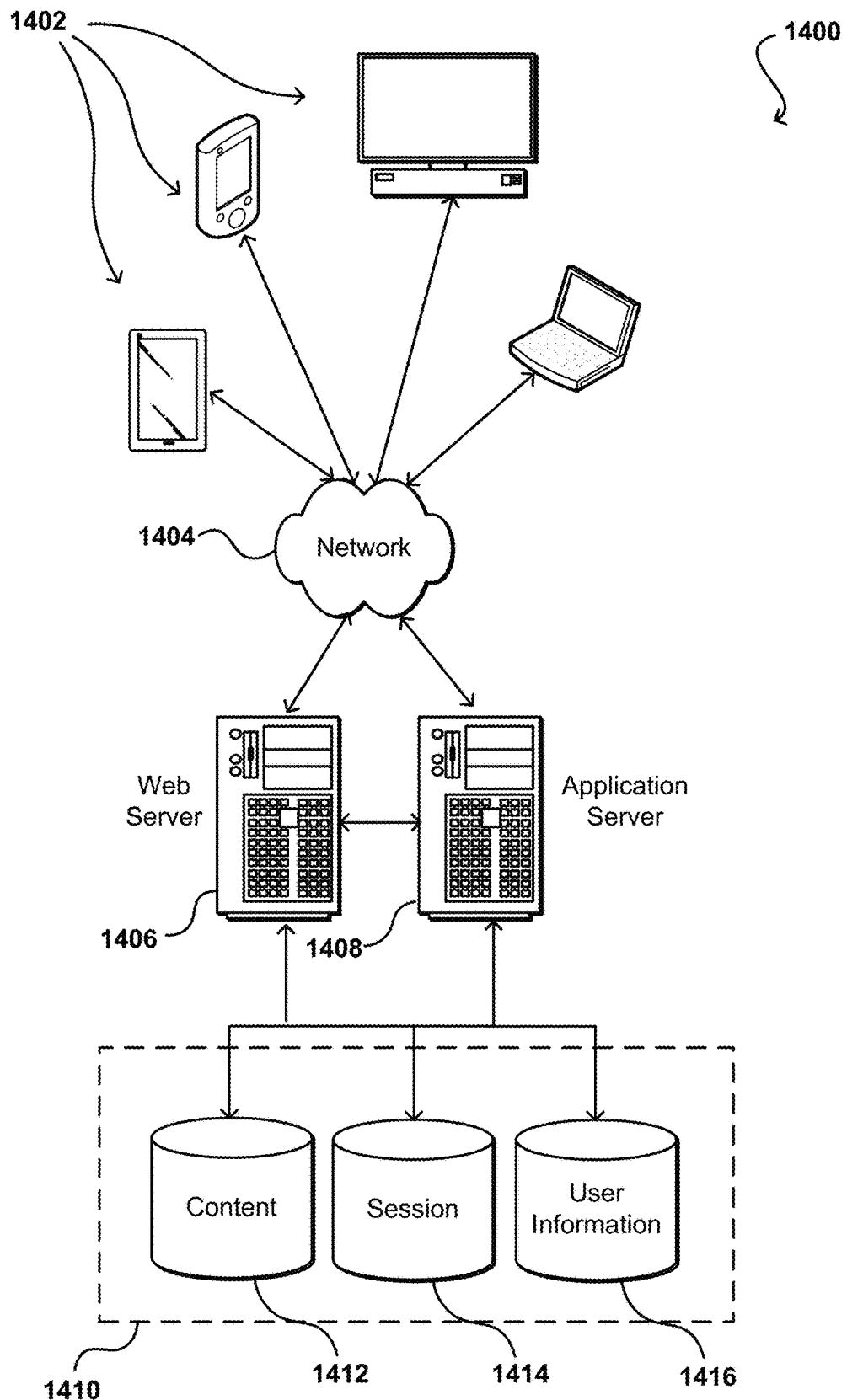
FIG. 14 illustrates an example environment in which aspects of the various embodiments can be implemented.

As discussed, different approaches can be implemented in various environments in accordance with the described embodiments. For example, FIG. 14 illustrates an example of an environment 1400 for implementing aspects in accordance with various embodiments. As will be appreciated, although a Web-based environment is used for purposes of explanation, different environments may be used, as appropriate, to implement various embodiments. The system includes an electronic client device 1402, which can include any appropriate device operable to send and receive requests, messages or information over an appropriate network 1404 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1406 for receiving requests and serving content in response thereto, although for other networks, an alternative device serving a similar purpose could be used, as would be apparent to one of ordinary skill in the art.

The illustrative environment includes at least one application server 1408 and a data store 1410. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1408 can include any appropriate hardware and software for integrating with the data store 1410 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1406 in the form of HTML, XML or another appropriate structured language in this example. The handling of all requests and responses, as well as the delivery of content between the client device 1402 and the application server 1408, can be handled by the Web server 1406. It should be understood that the Web and application servers are not required and are merely example components, as structured code discussed herein can be executed on any appropriate device or host machine as discussed elsewhere herein.

The data store 1410 can include several separate data tables, databases or other data storage mechanisms and media for storing data relating to a particular aspect. For example, the data store illustrated includes mechanisms for storing content (e.g., production data) 1412 and user information 1416, which can be used to serve content for the production side. The data store is also shown to include a mechanism for storing log or session data 1414. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1402. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, comprising:
receiving a rendering of an item as it appears within a catalog;
determining a scale of the rendering with respect to a virtual representation of a physical space;
positioning the rendering of the item within the virtual representation of the physical space, the rendering scaled to corresponding to dimensions of the virtual representation of the physical space;
providing, in response to a selection of the item, a product page including information about the item;
storing the virtual representation of the physical space, including the item, to a profile associated with a user; and
providing access to the stored virtual representation of the physical space, based at least in part on an access restriction designated by the user.

2. The method of claim 1, further comprising:
positioning a second rendering of a second item within the virtual representation of the physical space to generate an updated virtual representation of the physical space, the second rendering associated with a second user having access to the stored virtual representation;
storing the updated virtual representation of the physical space; and providing the updated virtual representation of the physical space to the user, in response to a request from the user.

3. The method of claim 2, further comprising:
receiving, from the user, a rejection of the updated virtual representation of the physical space; and
removing the second rendering from the updated virtual representation of the physical space.

4. The method of claim 1, further comprising:
providing the stored virtual representation of the physical space associated with the user profile, in response to a request from a second user;
presenting a list of items, selected by the user;
receiving a selection of an item from the list of items, from the second user; and
presenting a product page associated with the item.

5. The method of claim 1, wherein the product page includes at least one of a unique identifier (ID) for the item, images of the item, products other users have viewed, a price, a sale price, a rating, or user comments.

6. The method of claim 1, further comprising:
receiving a request to purchase the item; and
requesting a confirmation of the request to purchase the item.

7. The method of claim 1, wherein the rendering of the item is a two-dimensional rendering or a three-dimensional rendering.

8. A system, comprising:
at least one processor; and
memory including instructions that, when executed by the at least one processor, enable the system to:
receive a rendering of an item as it appears within catalog;
determine a scale of the rendering with respect to a virtual representation of a physical space;
position the rendering of the item within the virtual representation of the physical space, the rendering scaled to corresponding to dimensions of the virtual representation of the physical space;
provide, in response to a selection of the item, a product page including information about the item;
store the virtual representation of the physical space, including the item, to a profile associated with a user; and
provide access to the stored virtual representation of the physical space, based at least in part on an access restriction designated by the user.

9. The system of claim 8, wherein the memory further includes instructions that, when executed by the at least one processor, enable the system to:
position a second rendering of a second item within the virtual representation of the physical space to generate an updated virtual representation of the physical space, the second rendering associated with a second user having access to the stored virtual representation;
store the updated virtual representation of the physical space; and
provide the updated virtual representation of the physical space to the user, in response to a request from the user.

10. The system of claim 9, wherein the memory further includes instructions that, when executed by the at least one processor, enable the system to:
receive, from the user, a rejection of the updated virtual representation of the physical space; and
remove the second rendering from the updated virtual representation of the physical space.

11. The system of claim 8, wherein the memory further includes instructions that, when executed by the at least one processor, enable the system to:
provide the stored virtual representation of the physical space associated with the user profile, in response to a request from a second user;
present a list of items, selected by the user;
receive a selection of an item from the list of items, from the second user; and
present a product page associated with the item.

12. The system of claim 8, wherein the product page includes at least one of a unique identifier (ID) for the item, images of the item, products other users have viewed, a price, a sale price, a rating, or user comments.

13. The system of claim 8, wherein the memory further includes instructions that, when executed by the at least one processor, enable the system to:
receive a request to purchase the item; and
request a confirmation of the request to purchase the item.

14. The system of claim 8, wherein the rendering of the item is a two-dimensional rendering or a three-dimensional rendering.

15. A non-transitory computer-readable storage medium including instructions that, when executed by at least one processor of a computing system, cause the computing system to:
receive a rendering of an item as it appears within a catalog;
determine a scale of the rendering with respect to a virtual representation of a physical space;
position the rendering of the item within the virtual representation of the physical space, the rendering scaled to corresponding to dimensions of the virtual representation of the physical space;
provide, in response to a selection of the item, a product page including information about the item;
store the virtual representation of the physical space, including the item, to a profile associated with a user; and
provide access to the stored virtual representation of the physical space, based at least in part on an access restriction designated by the user.

16. The non-transitory computer-readable storage medium of claim 15, wherein the instructions when executed further cause the computing system to:
position a second rendering of a second item within the virtual representation of the physical space to generate an updated virtual representation of the physical space, the second rendering associated with a second user having access to the stored virtual representation;
store the updated virtual representation of the physical space; and
provide the updated virtual representation of the physical space to the user, in response to a request from the user.

17. The non-transitory computer-readable storage medium of claim 16, wherein the instructions when executed further cause the computing system to:
receive, from the user, a rejection of the updated virtual representation of the physical space; and
remove the second rendering from the updated virtual representation of the physical space.

18. The non-transitory computer-readable storage medium of claim 15, wherein the instructions when executed further cause the computing system to:
provide the stored virtual representation of the physical space associated with the user profile, in response to a request from a second user;

present a list of items, selected by the user;

receive a selection of an item from the list of items, from the second user; and present a product page associated with the item.

19. The non-transitory computer-readable storage medium of claim 15, wherein the product page includes at least one of a unique identifier (ID) for the item, images of the item, products other users have viewed, a price, a sale price, a rating, or user comments.

20. The non-transitory computer-readable storage medium of claim 15, wherein the instructions when executed further cause the computing system to:

receive a request to purchase the item; and request a confirmation of the request to purchase the item.

* * * * *